United States Patent [19]

Lee et al.

[11] Patent Number: 5,869,821
[45] Date of Patent: Feb. 9, 1999

[54] CREDIT INQUIRY SERVICE SYSTEM AND METHOD

[75] Inventors: Nam-No Lee, Suwon; Ik-Jae Yoon, Kwacheon; Heung-Soo Kim, Ahnyang; Moon-Kyun Woo, Suwon; Woo-Shik Kang, Suwon; Young-Jun Lee, Suwon, all of Rep. of Korea

[73] Assignee: SamSung Electronics Co., Ltd., Suwon, Rep. of Korea

[21] Appl. No.: 322,142

[22] Filed: Oct. 13, 1994

[30] Foreign Application Priority Data

Oct. 13, 1993 [KR] Rep. of Korea .................. 21201/1993

[51] Int. Cl.$^6$ ........................................................ H04L 9/32
[52] U.S. Cl. .................. 235/380; 340/825.33; 379/91.01; 705/21; 902/39
[58] Field of Search ..................................... 235/380, 382, 235/382.5; 340/825.33, 825.34; 375/200; 379/91.01, 91.02; 705/16, 17, 21, 39, 44, 45; 902/22, 39; 370/270, 271

[56] References Cited

U.S. PATENT DOCUMENTS

| 3,576,539 | 4/1971 | Huber . | |
|---|---|---|---|
| 3,697,693 | 10/1972 | Deschenes et al. . | |
| 4,017,835 | 4/1977 | Randolph . | |
| 4,425,642 | 1/1984 | Moses et al. . | |
| 4,665,516 | 5/1987 | Middleton et al. . | |
| 4,672,602 | 6/1987 | Hargrave et al. . | |
| 4,672,605 | 6/1987 | Husting et al. . | |
| 4,724,435 | 2/1988 | Moses et al. . | |
| 4,796,292 | 1/1989 | Thomas . | |
| 5,315,641 | 5/1994 | Montgomery et al. | 379/91.01 |
| 5,334,821 | 8/1994 | Campo et al. . | |
| 5,432,815 | 7/1995 | Kang et al. | 375/200 |
| 5,500,890 | 3/1996 | Rogge et al. | 379/91.02 |

*Primary Examiner*—Melvin Marcelo
*Attorney, Agent, or Firm*—Robert E. Bushnell, Esq.

[57] ABSTRACT

A credit inquiry service system for inquiring about the credit standing of a check or credit card uses subscriber lines of a public communication network. The system includes credit inquiry terminals connected to the subscriber lines for generating and transmitting an inquiry request message requesting information regarding the credit standing of the check or credit card. The credit inquiry terminals also receive an inquiry result message corresponding to the inquiry request message via the subscriber lines. The system further includes a line multiplex device for one by one serially selecting the subscriber lines connected to the credit inquiry terminals, receiving the inquiry request message from one of the credit inquiry terminals connected to a selected subscriber line, and transmitting the inquiry result message corresponding to the inquiry request message to the corresponding credit inquiry terminal. A multiplexer is connected to a distributor of the public communication network to facilitate access of the subscriber lines, and to connect a selected subscriber line to the line multiplex device. A computer center receives the inquiry request message from the line multiplex device and transmits the inquiry request message to a card company's computer. The computer center then receives the inquiry result message indicating the credit standing of the check or credit card, and transmits the inquiry result message to the line multiplex device. The line multiplex device then transmits the inquiry result message back to the respective credit inquiry terminal via its corresponding subscriber line.

24 Claims, 15 Drawing Sheets

CREDIT INQUIRY SERVICE SYSTEM AND METHOD

CROSS-REFERENCE TO RELATED APPLICATIONS

This application makes reference to, incorporates herein and claims all benefits available under 35 U.S.C. §119 and 120 from our application entited Credit Inquiry Service System And Method earlier filed in the Industrial Property Office of the Republic of Korea on 13 Oct., 1993 and then assigned Ser. No. 1993/21201, and the patent application of one of us entitled Data Modulator-Demodulator Apparatus Of A Spread Spectrum Communication System earlier filed in the U.S. Patent & Trademark Office on 5 Jul., 1994 and then assigned Ser. No. 08/266,864, now issued a U.S. Pat. No. 5,432,815.

BACKGROUND OF THE INVENTION

The present invention relates to a credit inquiry service system for inquiring about the credit status of a check or a credit card, and more particularly to a credit inquiry service system and method for performing the credit inquiry service using a public communication network.

In general, a credit inquiry service system is a system enabling a user using a credit inquiry terminal to inquire about the credit status of a check or a credit card by receiving information from a financial agency or a credit card company through a communication line. The advent of computer power greatly aided this process. Older efforts, such as U.S. Pat. No. 4,017,835 entitled System For Verifying Credit Status issued to Randolph discloses a credit status verification system using a computer, modem and interface controller. In Randolph '835, the computer generates messages that are then sent to terminal units over telephones lines via a modem. Interface controllers distinguish between the types of messages and identify terminal units for receipt of messages by the computer. While this invention had benefits at the time of its inception, the current era of communication demands greater performance.

More recently, there have been attempts at creating more advanced credit inquiry systems to accommodate the greater needs of today's modem society for enhanced security, faster speed of transactions, and lower unit cost per transaction. One such attempt is disclosed in Korean Patent Publication No. 92-10483 entitled A Credit Card Terminal published on 26 Jun., 1992 by Beong-duk Jun of Gold Star Electric Machinery Co. Lid. That reference contemplates a credit inquiry terminal incorporated into in a credit inquiry service system. That system also includes a microprocessor, modem and transceiver to enable user communication between a terminal and a computer. Although that system has merit in its own right, we believe that it can be improved. Specifically, we believe that a more innovative system can be created that will provide the user with the desired credit information more in a much securely, shorter time, and at a lower cost per transaction than is possible with the aforementioned system.

SUMMARY OF THE INVENTION

Accordingly, it is an object of the present invention to provide a credit inquiry service system and method to reduce the amount of time required for each inquiry about the credit status of a check or credit card.

It is another object to provide a credit inquiry service system and method to confirm the state of a credit inquiry terminal irrespective of the kind of terminal.

It is still another object to provide a credit inquiry service system and method to inquire about the credit status of a check or credit card regardless of subscriber line use.

It is still yet another object to provide a credit inquiry service system and method to inquire about the credit status of a check or credit card using bi-directional communication without causing adverse influence on the subscriber line.

It is a further object to provide a credit inquiry service system and method to confirm the state of a credit inquiry terminal, or to download information required in inquiring about the credit standing of a check or credit card to the credit inquiry terminal.

It is a still further object to provide a credit inquiry service system and process able to accommodate inquiries from a variety of different types of user terminals.

There and other objects may be achieved with a credit inquiry service system according to the principles of the present invention with credit inquiry terminals which are connected to respective subscriber lines of a public communication network. Credit inquiry terminals, which generate and transmit inquiry request information on the subscriber lines in an effort to inquiry about the credit standing of a check or credit card, receive information in response to the inquiry request information from the subscriber line, and then display information to a user. A line multiplex device, which sequentially selects series of subscriber lines connected to credit inquiry terminals, receives the inquiry from the credit inquiry terminal connected to the selected subscriber line, and transmits the responsive information to the inquiring credit inquiry terminal. A multiplexer connected to a distributor of the public communication network, accesses subscriber lines and connects the selected subscriber line to the line multiplex device. A computer center receives the inquiry request information from the line multiplex device, transmits the inquiry request information to a financial agency or to the card company's computer, and in turn receives the information responsive to the inquiry indicating the credit standing of the check or credit card from the financial agency or card company's computer.

The principles of the present invention selecting and connecting a subscriber line connected to a credit inquiry terminal in order to scan and determine the state of the credit inquiry terminals; determining the existence of the inquiry request information for inquiring about the credit standing of a check or credit card from the connected credit inquiry terminal; and disconnecting the subscriber line after receiving data indicating the non-existence of inquiry request information from the credit inquiry terminal. The inquiry request information is transmitted to a computer center when the inquiry request information is received from the credit inquiry terminal and, after receiving the inquiry request information, information provided in response to the inquiry is transmitted to the corresponding credit inquiry terminal after first selecting and connecting the subscriber line connected to the corresponding credit inquiry terminal.

The credit inquiry service method according to the present invention also contemplates determining whether an inquiry about the credit standing of a check or credit card exists after receiving initial information from the subscriber line; returning to an original state after generating and transmitting an inquiry request to the subscriber line when an credit inquiry exists; transmitting data indicating the non-existence of credit inquiry to the respective subscriber line and returning to the original state when the credit information that is responsive to the inquiry does not exist; and displaying a message in reply to the inquiry when the inquiry result information corresponding to the inquiry request is received from the subscriber line.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE PREFERRED EMBODIMENT

Figure 1:
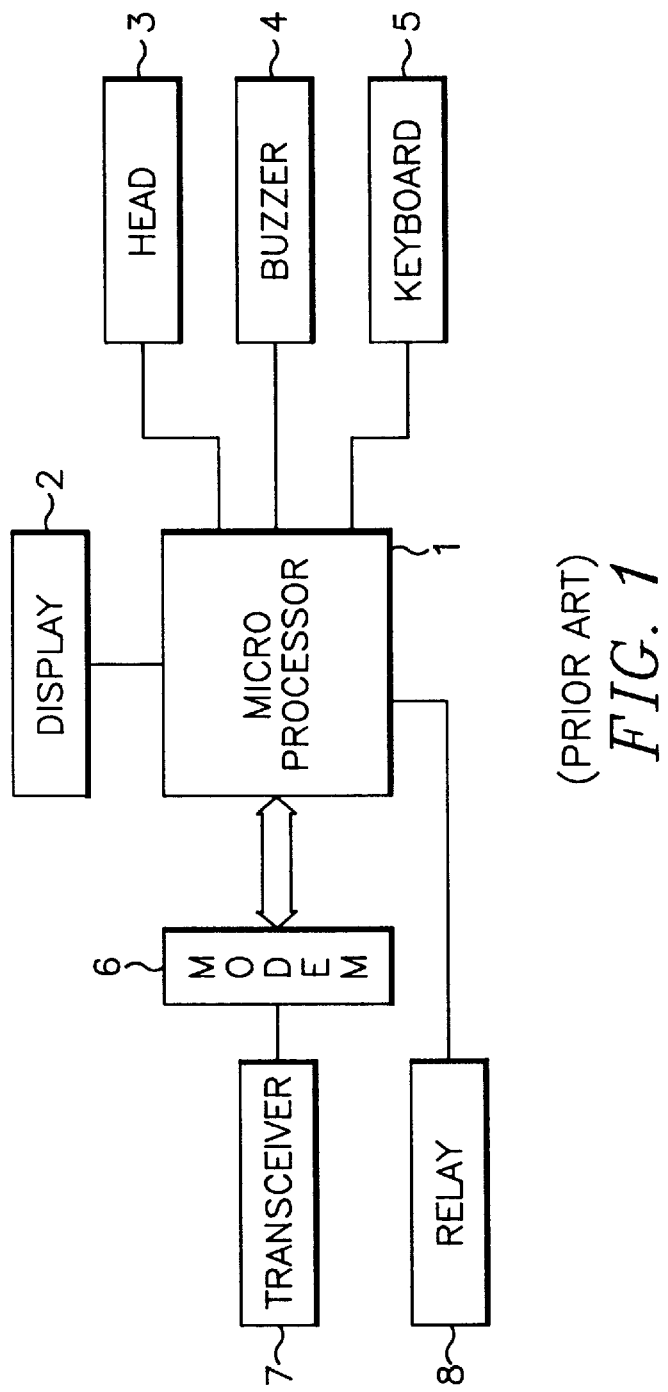
FIG. 1 is an abstract block diagram representation of a conventional credit inquiry terminal.
Figure 2:
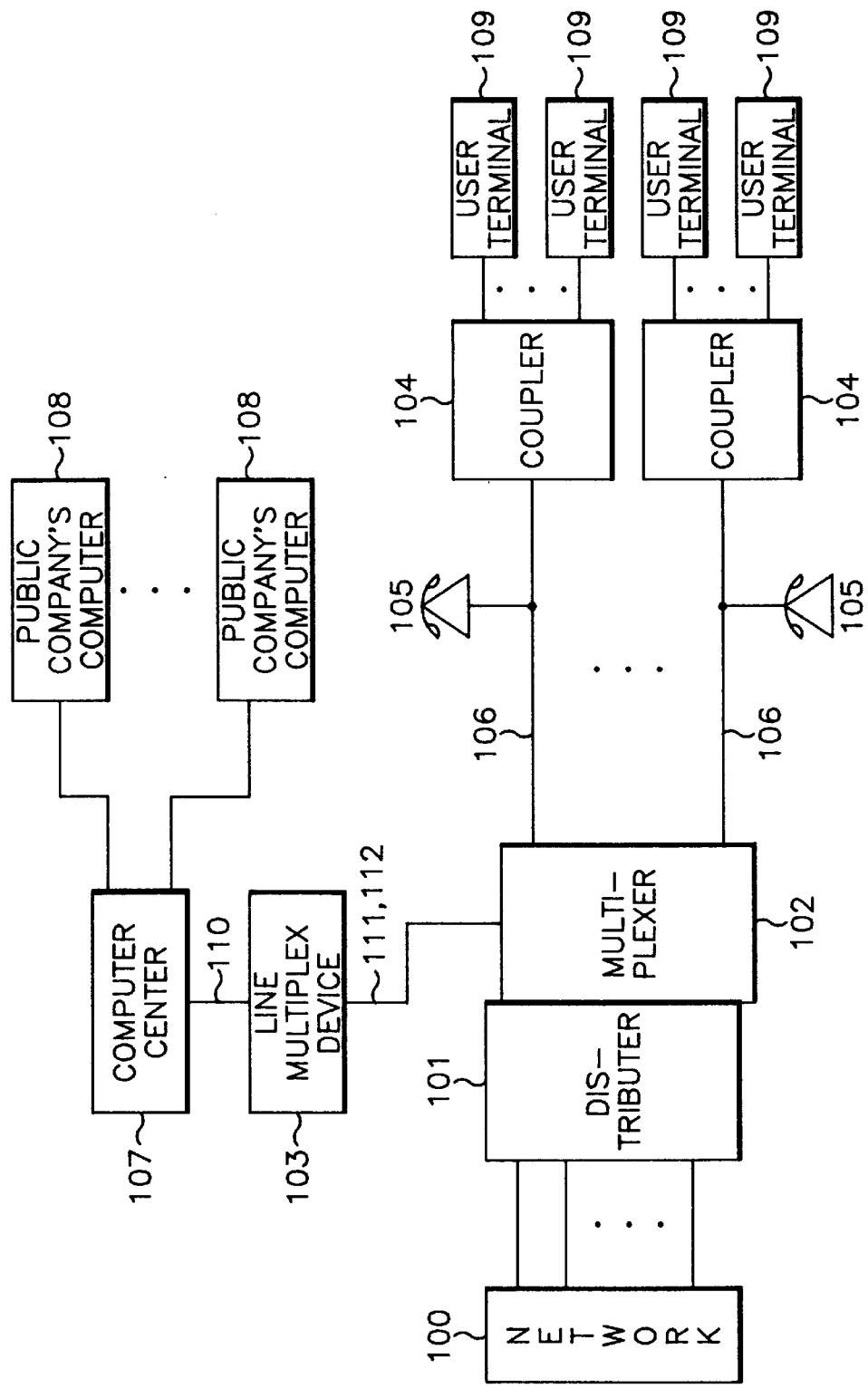
FIG. 2 is a block diagram of an earlier remote information processing system owned by the assignee of the present invention.

FIG. 1 shows the construction of the credit card inquiry terminal disclosed in the earlier discussed Korean Patent Publication No. 92-10483 (FIG. 1 of the instant patent application is the same as FIG. 2 shown in the accompanying drawings of Patent Publication No. 92-10483). In FIG. 1, a one-chip microprocessor 1 serves to control various external circuits and has a RS-232C, a ROM and a RAM installed therein. A display 2 receives data from microprocessor 1 and exhibits the operating state of the inquiry terminal to a user. A head 3 reads data recorded on a magnetic card, converts the data into an electrical signal and applies the electrical signal to microprocessor 1. A buzzer 4 controlled by microprocessor 1 informs the user of the operating state of the credit card terminal. A keyboard 5 having a matrix structure applies various data to microprocessor 1. A modem 6 receives data from microprocessor 1 and a transceiver 7 modulates and demodulates the data. Transceiver 7, which is capable of transmitting and receiving a signal to and from a telephone or other terminal, has a matching transfer function required to transmit the data. Transceiver 7 also protects internal circuits from excessive current and voltage levels. A relay 8 connects the credit card inquiry terminal to a telephone line under the control of microprocessor 1.

In Korean Patent Publication No. 92-10483, the operation of inquiring about the credit status of a check or credit card by using the credit card inquiry terminal shown in FIG. 1, is performed as follows. In the case of a credit card, data from the magnetic card which is converted to an electrical signal by head 3 or input via keyboard 5, is applied to microprocessor 1. Microprocessor 1 controls relay 8, connects the telephone line to transceiver 7 and transfers data via modem 6. The data input to modem 6 is modulated and then is transmitted to a computer (not shown) of a credit card company via transceiver 7. The result of the inquiry is received from the computer of the credit card company and is applied to microprocessor 1 via transceiver 7 and modem 6. At this time, microprocessor 1 displays the result of the inquiry, so that a customer can confirm the credit status of his credit card.

Since the credit card inquiry terminal disclosed in Korean Patent Publication No. 92-10483 is not directly connected to the computer of the credit card company, a user is forced to repeat operations necessary to complete an inquiry until a telephone line becomes available to connect the inquiring terminal to the computer. This is often very inconvenient, causing a user to waste valuable time while waiting for an available line. One way to solve this problem is to increase the number of telephone lines between the computer and the credit inquiry terminal. This, however, creates another problem by increasing the costs incurred in making and completing an inquiry. Moreover, in the aforementioned system the computer only communicates to a user via a one-way telephone line connection. That is, the computer receives information regarding an inquiry and transmits the information received in reply to the inquiry to the credit card terminal that made the inquiry, in response to user inputs from the inquiring credit card terminal. There is however another problem in that the state of the credit card terminal is not confirmed during the inquiry and the information necessary to inquire about the credit card is not downloaded to the credit card terminal.

Another system designed to manage various user terminals regardless of telephone line use is disclosed in Korean Patent Application No. 92-9189 entitled A Remote Information Process System filed on 28 May 1992 and published on 22 Dec., 1993 by Nam-No Lee of SamSung Electronics Co. Ltd., which is herein incorporated by reference.

FIG. 2 illustrates the construction of the remote information processing system disclosed in the aforementioned Korean Patent Application No. 92-9189 is shown. (This is the same as FIG. 2 of the accompanying drawings in the above Korean Patent Application. The system is explained in detail on pages 68 to 69 of the detailed description of the same Korean Patent Application.) In FIG. 2, a network 100 can be comprised of a telephone network or an interphone network that is used as an existing voice communication network. A distributor 101 connects with and can access subscriber lines 106 via multiplexer 102. Subscriber lines 106 are commonly connected to handsets 105 and couplers 104. Multiplexer 102 is coupled to distributor 101 so that the remote information processing system can flexibly expand according to increased subscriber use. Distributor 101 refers to a MDF (Main Distribution Frame) and an IDF (Intermediate Distribution Frame) of an exchange. Handsets 105 of the subscriber can be telephones or interphones. Couplers 104 are connected to user terminals 109 from which service is initiated. User terminals 109 can be alarm terminals, metering terminals, clinic terminals, or traffic terminals. A line multiplex device 103 controls multiplexer 102 and its connections with distributor 101 and accesses subscriber lines 106, thereby periodically scanning and communicating with couplers 104. A computer center 107 transmits an operational command to line multiplex device 103 and then collects the transmitted data and information that is obtained by the periodical scanning of couplers 104. A public company's computer 108 processes data received from computer center 107 and also manages all services of user terminals 109.

Operation of the remote information processing system disclosed in Korean Patent Application No. 92-9189 will now be described. First, in a situation where the operation command is not given from computer center 107 because data from public company's computer 108 has not been requested from user terminals 109, line multiplex device 103 serially scans couplers 104. Furthermore, line multiplex device 103 controls multiplexer 102 to connect one of the couplers 104 to a given subscriber line 106. Line multiplex device 103 then checks whether the given subscriber line 106 is currently being used. The term "operation command" refers to an order requesting a metering value, for example, when the user terminal 109 is a metering terminal. Line multiplex device 103 then checks the operating state of coupler 104 and the respective user terminal 109 by detecting an audio frequency or an inaudible frequency using the respective subscriber line 106. At this time, if necessary, line multiplex device 103 receives abnormal state information from coupler 104 and in turn informs computer center 107 of such information. The operating state of user terminals 109 is classified as either a normal state or an abnormal state. The above operations with respect to coupler 104 are performed serially.

Second, in a situation where data from public company's computer 108 is requested from one of the user terminals 109, computer center 107 transmits the operation command message to line multiplex device 103. Line multiplex device 103 connects subscriber line 106 and coupler 104 for the corresponding user terminal 109, and then checks whether that particular subscriber line 106 is being used or not. If the particular subscriber line 106 is being used, line multiplex device 103 causes the corresponding user terminal 109 to transmit the operation command message received from computer center 107 to coupler 104 via the line between coupler 104 and user terminal 109. Furthermore, line multiplex device 103 receives the information generated from user terminal 109 and then transmits the information to computer center 107.

Figure 3:
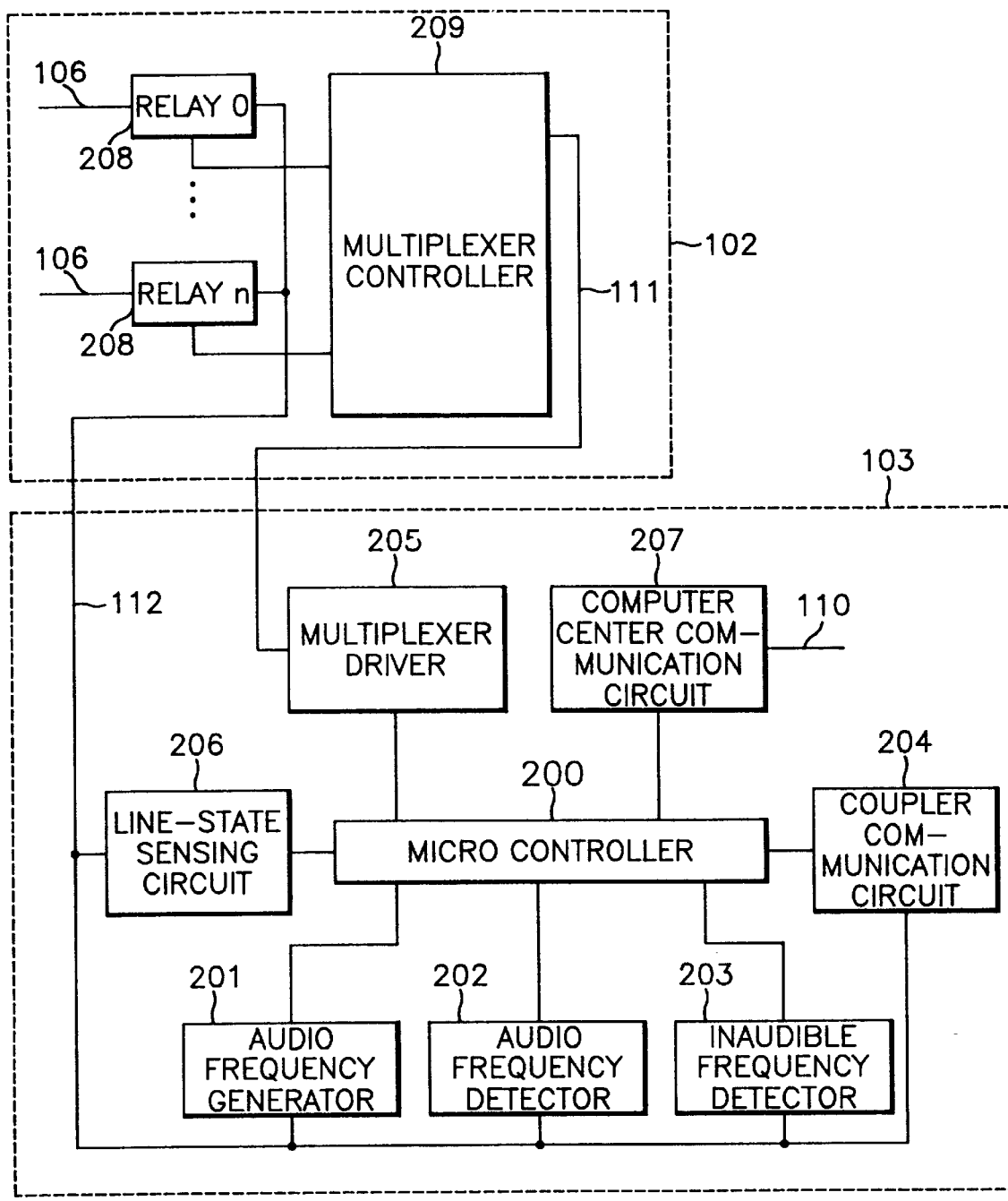
FIG. 3 is a detailed block diagram of the multiplexer and line multiplex device shown in FIG. 2.

A detailed block diagram of multiplexer 102 and line multiplex device 103 is shown in FIG. 3. (FIG. 3 is the same as FIG. 3A of the drawings that accompany Korean Patent Application No. 92-9189. These components are described in detail on pages 10 to 13 of the same Korean Patent Application.)

Referring to FIG. 3, multiplexer 102 includes relays 208 which are connected between subscriber lines 106 of network 100 and a communication line 112 of line multiplex device 103. Multiplexer 102 selectively connects subscriber lines 106 to line multiplex device 103 according to a control signal from a multiplexer controller 209. Multiplexer controller 209 serially outputs the control signals to relays 208 for scanning subscriber lines 106 according to a multiplexer control signal from line multiplex device 103.

A microcontroller 200 controls the various components of line multiplex device 103. An audio frequency generator 201 generates a signal for accessing a particular coupler 104 when the corresponding subscriber line 106 is not in use to perform the operation command received from computer center 107. An audio frequency detector 202 detects a response signal from coupler 104 with respect to the signal generated in audio frequency generator 201, and then informs microcontroller 200 of the detected signal. An inaudible frequency detector 203 detects an inaudible frequency received from coupler 104 when subscriber line 106 is being used, and then informs microcontroller 200 of the detected inaudible frequency. A coupler communication circuit 204 controlled by microcontroller 200 is used as a modulation/demodulation device for communicating with coupler 104. A multiplexer driver 205 generates the multiplexer control signal so that multiplexer controller 209 can control relays 208. In order to sense whether the particular subscriber line 106 is being used or not, a line state sensing circuit 206 senses whether line 112 led to line multiplex device 103 is being used, and then informs microcontroller 200 of the result. A computer center communication circuit 207 communicates via a line between microcontroller 200 and computer center 107.

Figure 4:
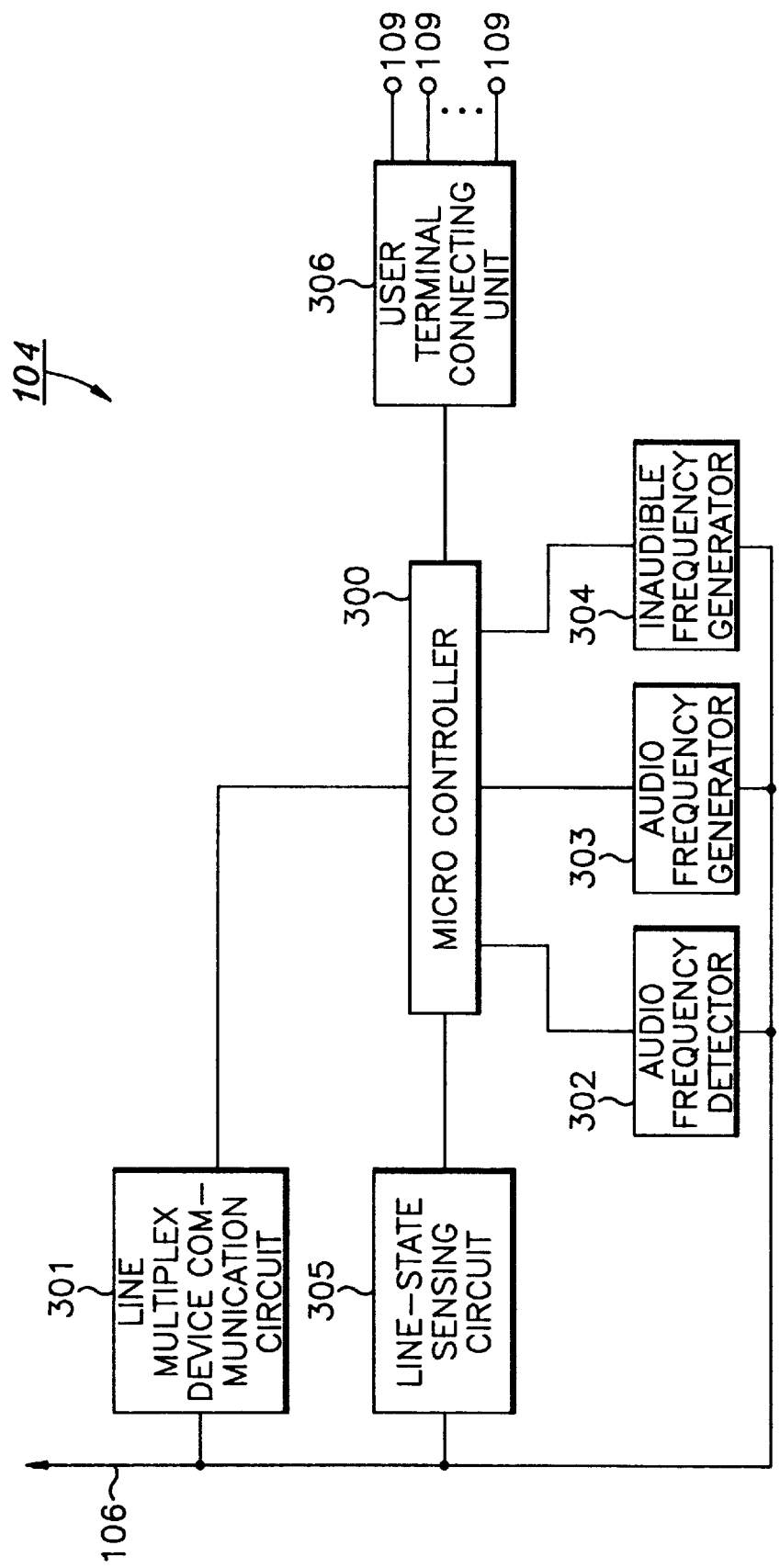
FIG. 4 is a detailed block diagram of the coupler shown in FIG. 2.

FIG. 4 shows a detailed block diagram of coupler 104. (FIG. 4 is the same as FIG. 4A of the drawings accompanying Korean Patent Application No. 92-9189. Coupler 104 is described in detail on pages 13 to 15 of the detailed description of the same Korean Patent Application.) A microcontroller 300 controls the various components of coupler 104. A line multiplex device communication circuit 301 controlled by microcontroller 300 is used as a modulation/demodulation device that communicates with line multiplex device 103. An audio frequency detector 302 detects the audio frequency received from line multiplex device 103 when subscriber line 106 is not in use, and then informs microcontroller 300 of the detected frequency. An audio frequency generator 303 generates a response signal with respect to the audio frequency received from line multiplex device 103, and then transmits the generated signal to line multiplex device 103. An inaudible frequency generator 304 generates the inaudible frequency in order to transmit to line multiplex device 103 a signal regarding the abnormal and normal states which may be generated in coupler 104 or user terminal 109 when subscriber line 106 is being used. A line state sensing circuit 305 senses whether or not the particular subscriber line 106 connected in parallel to coupler 104 is being used, and then informs microcontroller 300 as to the result. A user terminal connecting unit 306 communicates with the various user terminals 109 (service terminals), detecting the states of a particular user terminal 109 and the corresponding subscriber line 106.

In operation, line multiplex device 103 periodically scans coupler 104 when not performing the operation command. During this time, microcontroller 200 outputs the multiplexer control signal to multiplexer controller 209 by controlling multiplexer driver 205. After connecting the corresponding relay 208 and electrically coupling subscriber line 106, line state sensing circuit 206 detects whether or not subscriber line 106 is being used. If subscriber line 106 is not being used, line multiplex device 103 transmits an audio frequency (a) generated by audio frequency generator 201 to coupler 104 and then examines the current state. Coupler 104 communicates information regarding the state of user terminal 109 and coupler 104 to user terminal 109 during normal states. If audio frequency (a) is received from coupler 104 while coupler 104 or user terminal 109 are in the normal state, coupler 104 transmits an audio frequency (b) to line multiplex device 103. Then, in line multiplex device 103, microcontroller 200 senses the audio frequency (b) via audio frequency detector 202, regards the sensed frequency as indicative of the normal state, and successively scans the other couplers 104. However, if audio frequency (a) received from coupler 104 indicates an abnormal state of coupler 104 or user terminal 109, coupler 104 temporally transmits an audio frequency (c) generated by audio frequency generator 303 during a predetermined time period to line multiplex device 103, and then enters a step of communicating with line multiplex device 103. Line multiplex device 103 senses audio frequency (c) received from coupler 104 through audio frequency detector 202, inquires as to the kind of abnormal state of coupler 104 through the coupler communication circuit 204, and thereafter receives the result from coupler communication circuit 204. Line multiplex device 103 then informs computer center 107 of the received result via computer center communication circuit 207.

As mentioned above, when line multiplex device 103 connects subscriber line 106 to scan coupler 104 and checks whether or not subscriber line 106 is used via line state sensing circuit 206, if subscriber line 106 is being used, line multiplex device 103 checks whether or not the inaudible frequency is received from coupler 104. At this time, if the state of coupler 104 or user terminal 109 is normal, coupler 104 transmits an inaudible frequency (a) generated by inaudible frequency generator 304 to line multiplex device 103, thereby informing the latter of the normal state. Line multiplex device 103 receives inaudible frequency (a) from inaudible frequency detector 203, regards the received inaudible frequency (a) as the normal state, and then successively scans the other couplers 104. In the above step, if coupler 104 or user terminal 109 is in an abnormal state, coupler 104 transmits the inaudible frequency corresponding to the abnormal state to line multiplex device 103. Line multiplex device 103 then receives the transmitted inaudible frequency from inaudible frequency detector 203 and informs computer center 107 of the abnormal state.

If public company's computer 108 has information to be transmitted to coupler 104 or user terminal 109, public company's computer 108 transmits the operation command message to computer center 107. When computer center 107 receives the message and transmits the message to line multiplex device 103, line multiplex device 103 controls multiplexer 102 to select subscriber line 106 corresponding to coupler 104 for transmitting the operation command message. Thereafter, line multiplex device 103 determines whether subscriber line 106 is being used through line state sensing circuit 206. If subscriber line 106 is not being used, line multiplex device 103 transmits an audio frequency (d) to coupler 104, thereby checking the current state. If audio frequency (d) is received from coupler 104 indicative of the normal state of coupler 104 or user terminal 109, coupler 104 transmits audio frequency (b) to line multiplex device 103. Line multiplex device 103 detects audio frequency (b) through audio frequency detector 202 and concludes that coupler 104 is in the normal state. Furthermore, line multiplex device 103 controls coupler communication circuit 204, transmits the operation command message to coupler 104, receives the transmitted result from coupler communication circuit 204, and informs computer center 107 of the result, thereby ending the operation. However, if audio frequency (d) is received from coupler 104 indicative of the abnormal state of coupler 104 or user terminal 109, coupler 104 transmits audio frequency (c) to line multiplex device 103 during a predetermined time period, and then begins communicating with line multiplex device 103. Line multiplex device 103 detects audio frequency (c) received from coupler 104 through audio frequency detector 202 and inquires as to the type of abnormal state of coupler 104 through coupler communication circuit 204. Line multiplex device 103 then receives the result through coupler communication circuit 204 and informs computer center 107 of the result through computer center communication circuit 207.

As mentioned above, when line multiplex device 103 connects subscriber line 106 to transmit the operation command message to coupler 104 and checks whether subscriber line 106 is being used via line state sensing circuit 206, if subscriber line 106 is being used, line multiplex device 103 checks whether the inaudible frequency is received from coupler 104. During this time, if the state of coupler 104 or user terminal 109 is normal, coupler 104 transmits inaudible frequency (a) generated by inaudible frequency generator 304 to line multiplex device 103. Line multiplex device 103 then receives inaudible frequency (a) from inaudible frequency detector 203 and determines the state to be normal. During a three occurrence retrial, if subscriber line 106 is not being used, line multiplex device 103 transmits the operation command message to coupler 104 through coupler communication circuit 204, receives the transmitted result through coupler communication circuit 204, and informs computer center 107 of the result. On the contrary, if while the retrial subscriber line 106 is being used, line multiplex device 103 informs computer center 107 of the state of subscriber line 106. If coupler 104 or user terminal 109 is in the abnormal state, coupler 104 transmits the inaudible frequency corresponding to the abnormal state to line multiplex device 103. Line multiplex device 103 receives the inaudible frequency through inaudible frequency detector 203, thereby informing computer center 107 of the abnormal state.

Accordingly, the remote processing system disclosed in Korean Patent Application No. 92-9189 confirms or manages the state of the user terminal regardless of telephone line use.

The remote processing system disclosed in Korean Patent Application No. 92-9189 has four problems however. First, a great deal of time is required to confirm the state of coupler 104 or user terminal 109 by using the audio frequency and the inaudible frequency to obtain information via communication between line multiplex device 103 and coupler 104. Second, the type and content of the status information to be transmitted using the inaudible frequency, can be limited under the abnormal state of coupler 104 or user terminal 109 when the corresponding subscriber line 106 is being used. Third, information is not transmitted during the constant period of use of subscriber line 106 in the case that public company's computer 108 has information to be transmitted to coupler 104 or user terminal 109. Fourth, construction of the system is complicated and its cost is high since line state sensing circuit 305, audio frequency generator 303, audio frequency detector 302, inaudible frequency generator 304 and an inaudible frequency detector are required for proper system operation.

A more complete appreciation of the present invention, and many of the attendant advantages thereof, will be readily apparent as the same becomes better understood by reference to the following detailed description when considered in conjunction with the accompanying drawings in which like reference symbols indicate the same or similar components. Hereinafter, specific details such as processing steps and protocol control codes are described to convey a clear understanding of the present invention.

Figure 5:
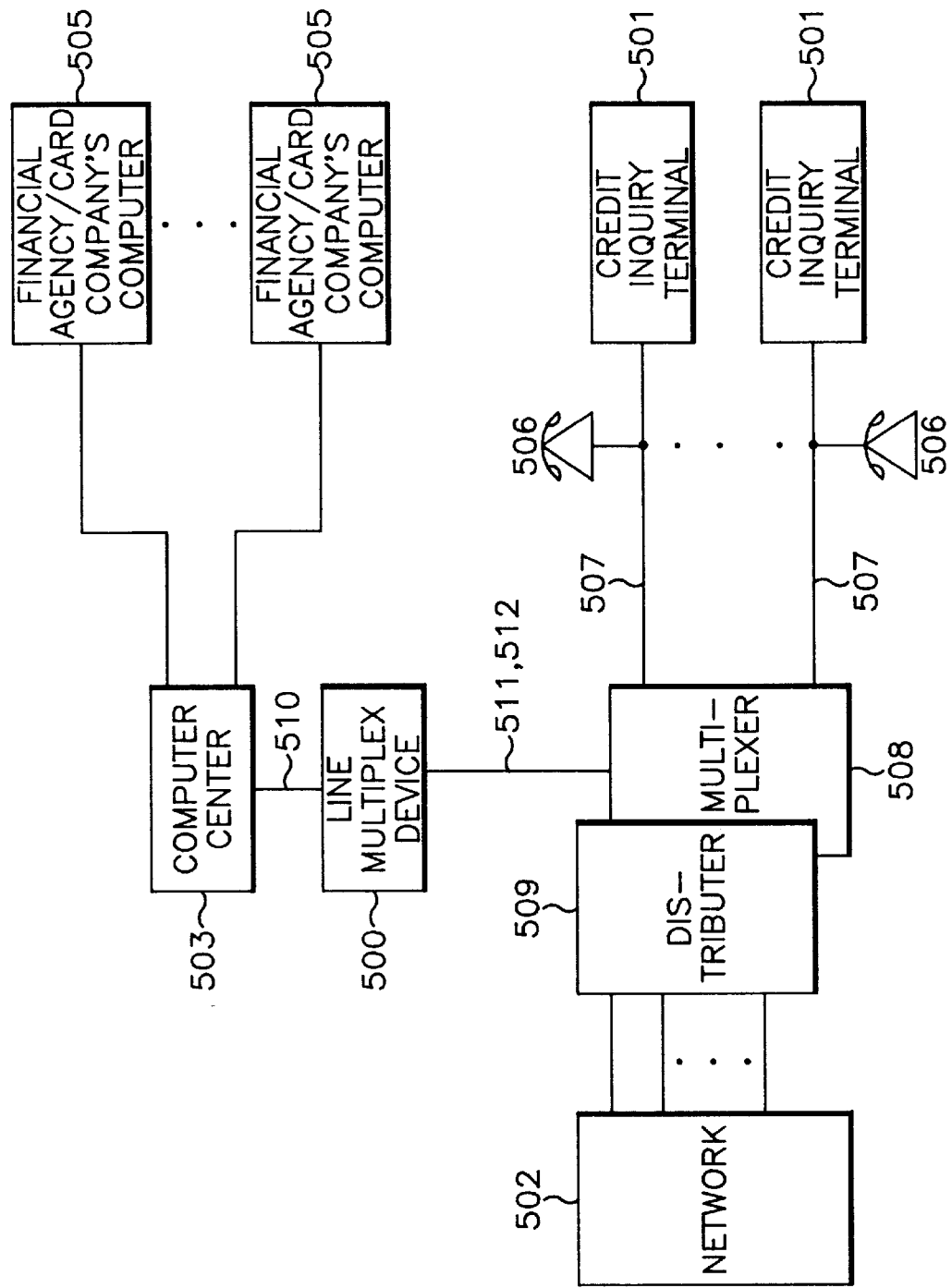
FIG. 5 is a block diagram of a credit inquiry service system constructed according to the principles of the present invention.
Figure 6:
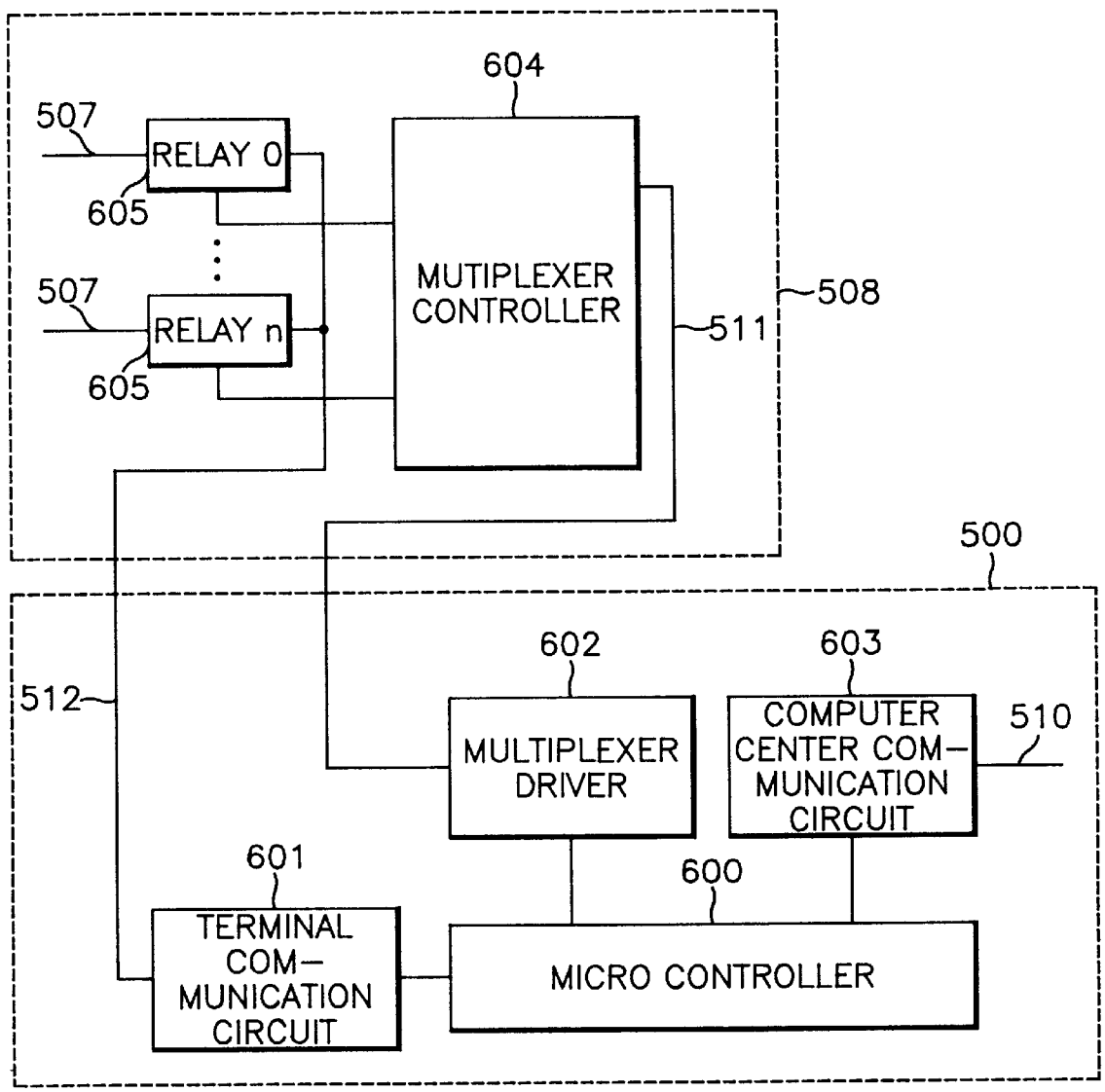
FIG. 6 is a detailed block diagram of the multiplexer and line multiplex device shown in FIG. 5.

FIG. 5 is a block diagram of the credit inquiry service system constructed according to the principles of the present invention. A line multiplex device 500 of FIG. 5, which is shown in greater detail in FIG. 6, is unlike line multiplex device 103 of FIG. 2. Also, user terminal 109 of FIG. 2 is substituted by a credit inquiry terminal 501 of FIG. 5, which is shown in greater detail in FIG. 7. Public company's computer 106 of FIG. 2 is substituted by a financial agency/card company's computer 505 in FIG. 5. Network 502, distributor 509 and multiplexer 508 shown in FIG. 5 are the same as those shown in FIG. 2.

Network 502 can be constructed as a voice communication network such as a telephone network or an interphone network. Distributor 509 connected to subscriber lines 507 is instrumentally coupled to a multiplexer 508 capable of accessing subscriber lines 507. Furthermore, handsets 506 connected to subscriber lines 507 are connected in parallel to credit inquiry terminals 501. The remote information processing system is easily assembled by connecting line multiplex device 500 to subscriber lines 506. Multiplexer 508 is instrumentally coupled to distributor 509 to enable expansion of the system according to an increase in the number of subscribers. Distributor 509 refers a MDF (main distributor frame) and an IDF (intermediate distributor frame) of an exchange. Handsets 506 can be telephones or interphones.

A quantity of credit inquiry terminals 501 are connected to corresponding subscriber lines 507, which in turn are connected in parallel to handsets 506. Credit inquiry terminals 501 generate an inquiry request message to request a credit inquiry when information regarding the credit standing of a check or credit card exists. The inquiry request message is generated after receiving inquiry information inquiring about the state of the particular credit inquiry terminal 501 from line multiplex device 500. Credit inquiry terminals 501 transmit the inquiry request message to line multiplex device 500 via the corresponding subscriber lines 507. After the inquiry request message is transmitted, credit inquiry terminals 501 receive an inquiry result message corresponding to the inquiry request message from line multiplex device 500. The inquiry result message is then displayed.

Line multiplex device 500 controls multiplexer 508 which is coupled to distributor 509 and serially selects subscriber lines 507 connected to credit inquiry terminals 501 one by one. Line multiplex device 500 receives the inquiry request message from the credit inquiry terminal 501 which is connected to the selected subscriber line 507, and then transmits the inquiry request message to a computer center 503. Line multiplex device 500 receives the inquiry result message corresponding to the inquiry request message from computer center 503, and then transmits the inquiry result message to the corresponding credit inquiry terminal 501.

Computer center 503 receives the inquiry request message of the particular credit inquiry terminal 501 from line multiplex device 500 and then transmits the inquiry request message to financial agency/card company's computer 505. Also, computer center 503 receives the inquiry result message corresponding to the inquiry request message from financial agency/card company's computer 505, and then transmits the inquiry result message to line multiplex device 500.

As a computer for a typical financial agency or credit card company, financial agency/card company's computer 505 confirms the credit status of a check or credit card pursuant to the inquiry request message from credit inquiry terminal 501. After the inquiry request message is received through line multiplex device 500 and computer center 503, financial agency/card company's computer 505 generates the inquiry result message indicative of the result of the credit confirmation, and then transmits the inquiry result message to computer center 503.

FIG. 6 shows a detailed block diagram of multiplexer 508 and line multiplex device 500 of FIG. 5. Multiplexer 508 comprises relays 605 which are connected to the various subscriber lines 507 in the same manner as multiplexer 102 of FIG. 3. Multiplexer 508 connects the corresponding subscriber line 507 to line multiplex device 500 according to a control signal from multiplexer controller 604. Multiplexer controller 604 is included within multiplexer 508 and generates the control signal to control switching operations of relays 605 according to a multiplexer control signal from line multiplex device 500.

Line multiplex device 500 is constructed without the audio frequency generator 201, audio frequency detector 202, inaudible frequency generator 203 and line-state sensing circuit 206 of the prior art line multiplex device 103 shown in FIG. 3. A terminal communication circuit 601 for communicating with credit inquiry terminals 501 is included in the present invention instead of the coupler communication circuit 204 of FIG. 3. A multiplexer driver 602, which is coupled between microcontroller 600 and multiplexer controller 604, transmits the multiplexer control signal for serially selecting subscriber lines 507 to multiplexer controller 604 pursuant to the control of microcontroller 600, thereby driving relays 605. Terminal communication circuit 601 is coupled between microcontroller 600 and a communication line 512. Communication line 512 is connected to subscriber lines 507 through relays 605. Terminal communication circuit 601 uses a data modulator-demodulator apparatus of a band spread spectrum communication system such as the one disclosed in Korean Patent Application No. 93-18944 entitled Data Modulator-Demodulator Apparatus Of A Band Spread Spectrum Communication System filed in 1993 by the applicant of the present invention. This system is also disclosed in co-pending U.S. patent application Ser. No. 08/266,864 filed on 5 Jul., 1994 by the assignee of the present invention and issued as U.S. Pat. No. 5,432,815 which is herein incorporated by reference. Terminal communication circuit 601 receives data representative of the inquiry result message to be transmitted to credit inquiry terminal 501 from microcontroller 600, performs the band spread spectrum operation (to be discussed in conjunction with FIG. 8), converts the data to an analog signal and then transmits the analog signal to credit inquiry terminal 501 through the respective subscriber line 507. Similarly, terminal communication circuit 601 converts the analog signal of the inquiry request message received from credit inquiry terminal 501 through the respective subscriber line 507 to digital data, performs a reverse band spread spectrum operation (to be discussed in conjunction with FIG. 8) on the converted digital data, and then applies the data to microcontroller 600. A computer communication circuit 603, which is coupled between microcontroller 600 and computer center 503 through a communication line 510, transmits and receives information with computer center 503. Microcontroller 600 generally controls each component of line multiplex device 500. Microcontroller 600, which controls multiplexer driver 602 to serially select subscriber lines 507, transmits the inquiry request message received through terminal communicating part 601 from credit inquiry terminal 501, to computer center 503 through computer center communication circuit 603. Similarly, when receiving the inquiry result message from computer center 503 through computer center communication circuit 603, microcontroller 600 controls multiplexer driver 603 to select the subscriber line 507 connected to the corresponding credit inquiry terminal 501. Microcontroller 600 then enables transmission of the inquiry result message to the corresponding credit inquiry terminal 501 through terminal communication circuit 601.

Figure 7:
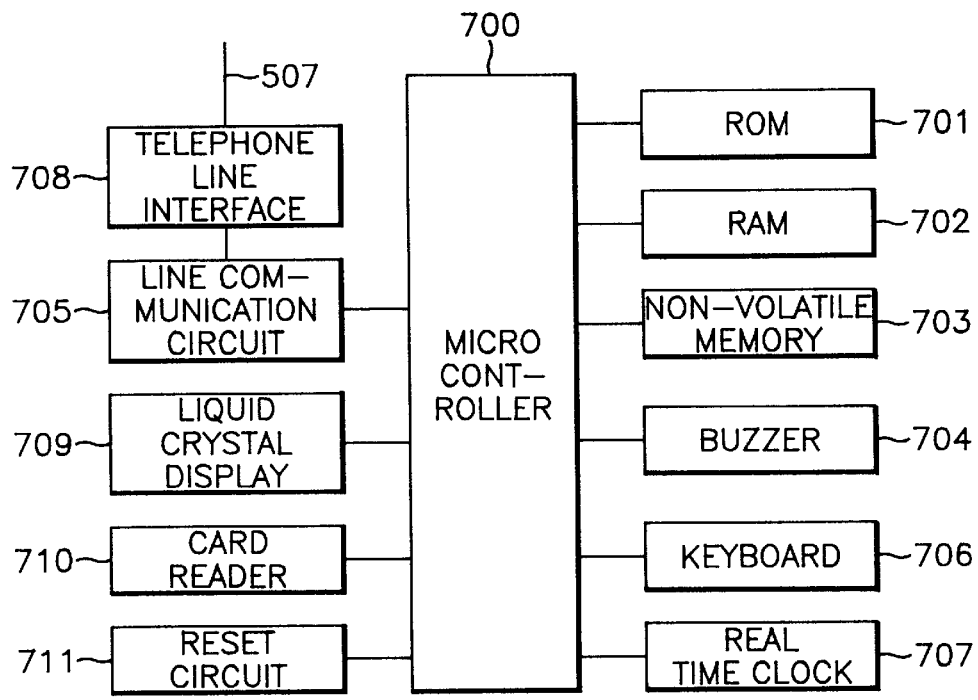
FIG. 7 is a detailed block diagram of the credit inquiry terminal used in the present invention.

FIG. 7 shows a detailed block diagram of the credit inquiry terminal 501 of FIG. 5. A microcontroller 700 generally controls each component of credit inquiry terminal 501. In operation, the credit standing of a check or credit card can be inquired about by inputting information via a card reader 710 and/or a keyboard 706. In such an instance, microcontroller 700 generates the inquiry request message and enables transmission of the inquiry request message to line multiplex device 500 through line communication circuit 705, to thereby confirm the credit standing of the check or credit card from computer center 503. A ROM (Read Only Memory) 701 stores a program to enable performance of the credit inquiry process by microcontroller 700. A RAM (Random Access Memory) 702 temporarily stores information of microcontroller 700 which is generated during the credit inquiry process. A non-volatile memory 703 is coupled to microcontroller 700 and stores important information regarding credit inquiry terminals 501, thereby ensuring that the information is not lost in case of a power failure. A buzzer 704 is also controlled by microcontroller 700. When a credit card is read or keys on keyboard 706 are input, buzzer 704 audibly informs a user as to whether the input is normal or not. Line communication circuit 705, which is coupled between subscriber lines 507 and microcontroller 700, uses a data modulator-demodulator apparatus of a band spread spectrum communication system as disclosed in Korean Patent Application No. 93-18944, just as terminal communication circuit 601. Line communication circuit 705 performs the band spread spectrum operation on the data representative of the inquiry request message applied from microcontroller 700, converts the data to an analog signal, and then transmits the analog signal to line multiplex device 500 through a respective subscriber line 507. Moreover, line communication circuit 705 converts the analog signal representative of the inquiry result message applied from line multiplex device 500 through the respective subscriber line 507 to digital data, performs the reverse band spread spectrum operation on the digital data, and then applies the data to microcontroller 700. Keyboard 706 is coupled to microcontroller 700 and provides keys for user inputs of information regarding credit inquiries for checks or credit cards. A real time clock 707 is coupled to microcontroller 700 and provides current time data to microcontroller 700. A telephone line interface 708 is coupled between line communication circuit 705 and subscriber lines 507 to interface signals transmitted and received through subscriber lines 507. A liquid crystal display 709 is coupled to microcontroller 700 and provides a variable visual display as to the state of system proceedings for each credit inquiry. The result of each inquiry is also exhibited on liquid crystal display 709 pursuant to the control of microcontroller 700, thereby keeping users promptly informed of the inquiry process and results. Card reader 710, which is also coupled to microcontroller 700, reads magnetic data recorded on credit cards and applies the data to microcontroller 700. A reset circuit 711 generates a power-on reset signal when power is initially turned on and applies the power-on reset signal to microcontroller 700, thereby driving microcontroller 700.

Figure 8:
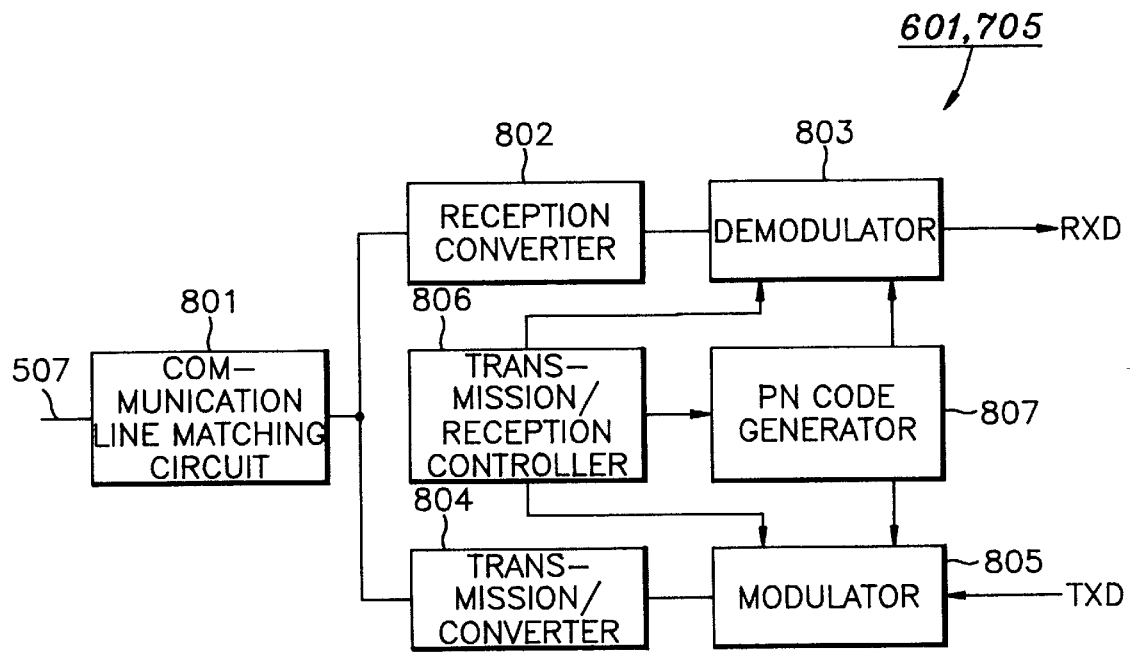
FIG. 8 is detailed block diagram of the terminal communication circuit of FIG. 6 and the line communication circuit of FIG. 7.

Referring now to FIG. 8, a detailed block diagram of terminal communication circuit 601 of FIG. 6 and line communication circuit 705 of FIG. 7 is shown, as disclosed in the aforementioned Korean Patent Application No. 93-18944 and co-pending U.S. patent application Ser. No. 08/266,864, issued as U.S. Pat. No. 5,432,815. It is the circuit in FIG. 8 that enables performance of the aforementioned band spread spectrum operation and reverse band spread spectrum operation. Band spread spectrum operations are particularly beneficial in the credit inquiry system of the present invention since they effectively avoid communication problems such as interference attributable to multiple propagation paths between a transmitter and a receiver. They also provide excellent privacy to system users. The implementation of the band spread spectrum operation system is based on the generation of spreading codes, such as pseudorandom sequences, at both transmitting and receiving portions of the system.

In FIG. 8, a transmission/reception controller 806 generates a transmission control signal and a reception control signal for controlling the modulation and demodulation of transmitted and received data. The transmission control signal and the reception control signal are then applied to a modulator 805 and a de-modulator 803, respectively. A PN (Pseudo Noise) code generator 807, which generates a predetermined PN code for spreading and de-spreading transmitted and received data, respectively, supplies the code to modulator 805 and demodulator 803. Modulator 805 converts parallel transmission data TXD input from microcontroller 600 or 700 to serial data, and adds a parity bit to protect against errors. Modulator 805 also performs a band spreading operation on the serial data using the PN code generated from PN code generator 807, adds header and synchronization data in dependence upon the transmission control signal from transmission/reception controller 806, generates and modulates line-coded data, and then outputs modulated data to a transmission converter 804. Transmission converter 804, which is coupled between a communication line matching circuit 801 and modulator 805, performs digital-to analog conversion and transmits the resulting analog signal to a respective subscriber line 507 through communication line matching part 801. Communication line matching circuit 801, which is coupled between subscriber lines 507, transmission converter 804 and reception converter 802, matches the signal transmitted/received through subscriber lines 507. Reception converter 802 is coupled between communication line matching circuit 801 and demodulator 803. Reception converter 802 removes the voice band of the signal received from subscriber lines 507, passes a signal consisting of only pure data, converts the pure data signal to a digital signal and then applies the digital signal to demodulator 803. Demodulator 803 is coupled between reception converter 802 and microcontroller 600 or 700. After removing noise from the data output from reception converter 802 and line-decoding the data in dependence upon the reception control signal from transmission/ reception controller 806, demodulator 803 performs a reverse band spreading operation (i.e. de-spreading) on the data using the PN code generated from PN code generator 807, corrects errors in the data, converts the data to parallel, and then outputs the converted parallel reception data RXD to micro controller 600 or 700.

Referring to FIGS. 5 through 7, the following describes the operation of the credit inquiry service system constructed according to the principles of the present invention. Line multiplex device 500, which controls multiplexer 508, one by one serially selects subscriber lines 507 connected to credit inquiry terminals 501, thereby scanning a selected subscriber line 507 and its respective credit inquiry terminal 501.

In a situation of inquiring about the credit standing of a check or credit card using credit inquiry terminal 501 under the above conditions, microcontroller 700 of credit inquiry terminal 501 reads the magnetic data recorded on a credit card via card reader 710 or information on a check which is input through keyboard 706. In response to the information provided, microcontroller 700 generates the inquiry request message indicating that a user desires to perform a credit inquiry. In the prior art, communication has been performed by using an audio frequency in cases where subscriber line 507 is being used and by using an inaudible frequency in cases where subscriber line 507 is not being used. In the present invention, however, when subscriber line 507 is connected to line multiplex device 500 through multiplexer 508, credit inquiry terminal 501 transmits the inquiry request message to line multiplex device 500 through line communicating circuit 705 regardless of the state of use of subscriber line 507, and then waits for the inquiry result message. After receiving the inquiry request message from credit inquiry terminal 501 through terminal communication circuit 601, line multiplex device 500 disconnects subscriber line 507 connected to the corresponding credit inquiry terminal 501, transmits the inquiry request message through computer center communication circuit 603 to computer center 503. In turn, computer center 503 transmits the inquiry request message received from line multiplex device 500 to the corresponding financial agency/card company's computer 505.

Then, after determining the credit standing of the check or credit card in response to the inquiry request message, financial agency/card company's computer 505 generates the inquiry result message representative of the result, and then transmits the inquiry result message to computer center 503. When computer center 503 transmits the inquiry result message to line multiplex device 500, line multiplex device 500 selects and connects subscriber line 507 connected to the corresponding credit inquiry terminal 501 by controlling multiplexer 508. Line multiplex device 500 then transmits the inquiry result message to the corresponding credit inquiry terminal 501 through terminal communication circuit 601. Credit inquiry terminal 501 receives the inquiry result message through line communication circuit 705, analyzes the inquiry result message, and then displays the inquiry result on liquid crystal display 709.

Accordingly, line multiplex device 500 periodically scans credit inquiry terminal 501 and communicates with the credit inquiry terminal 501 using the band spread spectrum communication system, so that it becomes possible to inquire about the credit standing of a check or credit card regardless of whether the corresponding subscriber line is in use. It is also possible to perform data communication without affecting a telephone user even if the particular subscriber line 507 is being used.

Figure 9A:
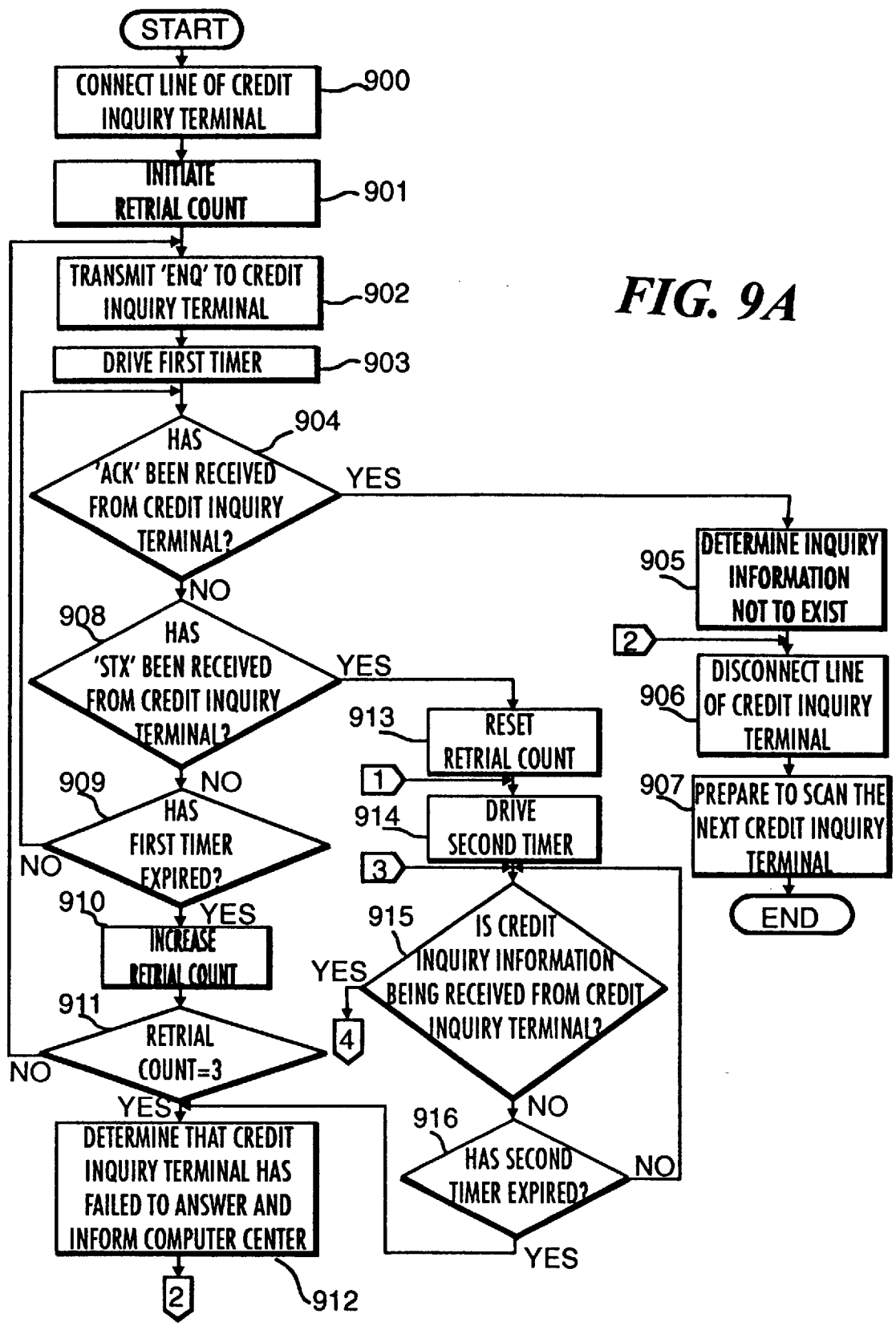
FIGS. 9A, 9B, 9C and 9D are flow charts showing significant steps performed by the process of operation of the line multiplex device used in the practice of the present invention.

FIG. 9A is a flow chart illustrating the operational procedure of line multiplex device 500 when scanning credit inquiry terminals 501. FIG. 9A shows how the credit standing of a check or credit card can be inquired about using credit inquiry terminals 501 and also shows instances when the credit standing can not be inquired about. To perform the scanning operation, line multiplex device 500 controls multiplexer 508 and connects the credit inquiry terminal 501 to be scanned to the respective subscriber line 507 in step 900. In step 901, line multiplex device 500 initiates a retrial count value indicative of a number of retrials (i.e. the retrial count value represents the number of times a response has not been provided within a designated time limit and the number of operational errors). This is done to establish a protocol for using credit inquiry terminal 501.

Next, in step 902, line multiplex device 500 transmits an inquiry code ENQ to credit inquiry terminal 501 to check whether information for inquiring about the credit standing of a check or credit card exists or not. In step 903, in response to transmission of the inquiry code ENQ, line multiplex device 500 drives a first timer to monitor how long it takes to receive an acknowledge code ACK or a text start code STX from credit inquiry terminal 501. Inquiry code ENQ, acknowledge code ACK, and text start code STX are protocol control codes. Inquiry code ENQ is a protocol control code used to request a response from a particular terminal. Acknowledge code ACK is a protocol control code indicating that an affirmation answer needs to be provided to a transmitting side from a receiving side. Text start code STX is a protocol control code used to indicate entry of a first character of text.

During this time, in step 904, a determination is made by line multiplex device 500 as to whether acknowledge code ACK from credit inquiry terminal 501 has been received. If acknowledge code ACK has been received, line multiplex device 500 determines in step 905 that credit inquiry information does not exist, and then proceeds to step 906. In step 906, line multiplex device 500 disconnects subscriber line 507 of the connected credit inquiry terminal 501 and then prepares to scan the next credit inquiry terminal 501 in step 907.

If, however, acknowledge code ACK has not been received from credit inquiry terminal 501 in step 904, line multiplex device 500 determines in step 908 whether text start code STX from credit inquiry terminal 501 has been received. If it has not been received, line multiplex device 500 proceeds to step 909 where a determination is made as to whether the first timer has expired. If the first timer has expired, line multiplex device advances to step 910 where the retrial count value is increased by 1. Next, in step 911, line multiplex device 500 determines whether the retrial count value equals three. If the retrial count value equals three, line multiplex device 500 proceeds to step 912 where it is determined that credit inquiry terminal 501 has failed to answer and computer center 503 is in turn informed of this determination. Thereafter, line multiplex device 500 sequentially proceeds to the aforementioned steps 906 and 907. If, however, the retrial count value is not determined to be three in step 911, line multiplex device 500 returns back to step 902 by transmitting inquiry code ENQ to credit inquiry terminal 501 and again performs the steps thereafter.

If text start code STX is determined to have been received from credit inquiry terminal 501 in step 908, line multiplex device 500 proceeds to step 913 where the retrial count value is reset. Then, in step 914, a second timer for monitoring how long to takes to receive credit inquiry information from credit inquiry terminal 501 is driven. Next, in step 915, line multiplex device 500 determines whether the credit inquiry information is being received from credit inquiry terminal 501. If it is not being received, line multiplex device proceeds to step 916 where it is determined where the second timer has expired. If the second timer has expired, line multiplex device 500 proceeds to step 912 where it is determined that credit inquiry terminal 501 has failed to answer and computer center 503 is in turn informed of this information. On the contrary, if the second timer has not expired, line multiplex device 500 returns back to step 915.

If, however, credit inquiry information is being received in step 915, line multiplex device 500 receives the information from credit inquiry terminal 501 and then checks, in step 917, whether the reception of the credit inquiry information has been completed. If it has not been completed, step 915 is repeated. If the credit inquiry information has been completely received, line multiplex device 500 proceeds to step 918 where it determines whether the received credit inquiry information is correct by performing backward error correction after checking a BCC (Block Check Code) value of the received information. If the BCC value indicates errors, line multiplex device 500 proceeds to step 919 where the retrial count value is increased by one. In step 920, line multiplex device 500 then determines whether the retrial count value equals three. If the retrial count value is not equal to three, line multiplex device 500 advances to step 921 where it transmits a non-acknowledge code NACK to credit inquiry terminal 501 and then proceeds to step 922 after requesting re-transmission of the credit inquiry information. Non-acknowledge code NACK is a protocol control code indicating that a negative response has been provided to the transmitting side by the receiving side. In step 922, line multiplex device 500 drives a third timer to monitor the amount of time for receiving text start code STX from credit inquiry terminal 501, and then proceeds to step 923.

In step 923, line multiplex device 500 determines whether text start code STX has been received from credit inquiry terminal 501. If it is determined not to have been received, line multiplex device 500 proceeds to step 924. In step 924, line multiplex device 500 determines whether or not the third timer has expired. If the third timer has expired, line multiplex device 500 proceeds again back to step 919. In step 919, line multiplex device 500 increases the retrial count value by one and again performs the above step of determining whether the retrial count value is equal to three. If in step 924, the third timer has not expired, line multiplex device 500 proceeds back to step 923. In step 920, if the retrial count value equals three, line multiplex device 500 proceeds to step 925 where it communicates with coupler 401, determines that the protocols have not been complied with, and then informs computer center 503 of this information. Then, returning to step 906, line multiplex device 500 disconnects the present subscriber line 507, and prepares to scan the next credit inquiry terminal 501 in step 907.

Furthermore, in step 918, if the BCC value indicates that no errors are present, line multiplex device 500 proceeds to step 926 where acknowledge code ACK is transmitted to credit inquiry terminal 501, thereby informing the user that the credit inquiry information has been correctly received. Next, in step 927, line multiplex device 500 informs computer center 503 of the inquiry request information and then proceeds again back to step 906. In step 906, line multiplex device 500 disconnects the applicable subscriber line 507, and then prepares to scan the next credit inquiry terminal 501 in step 907.

Figure 9B:
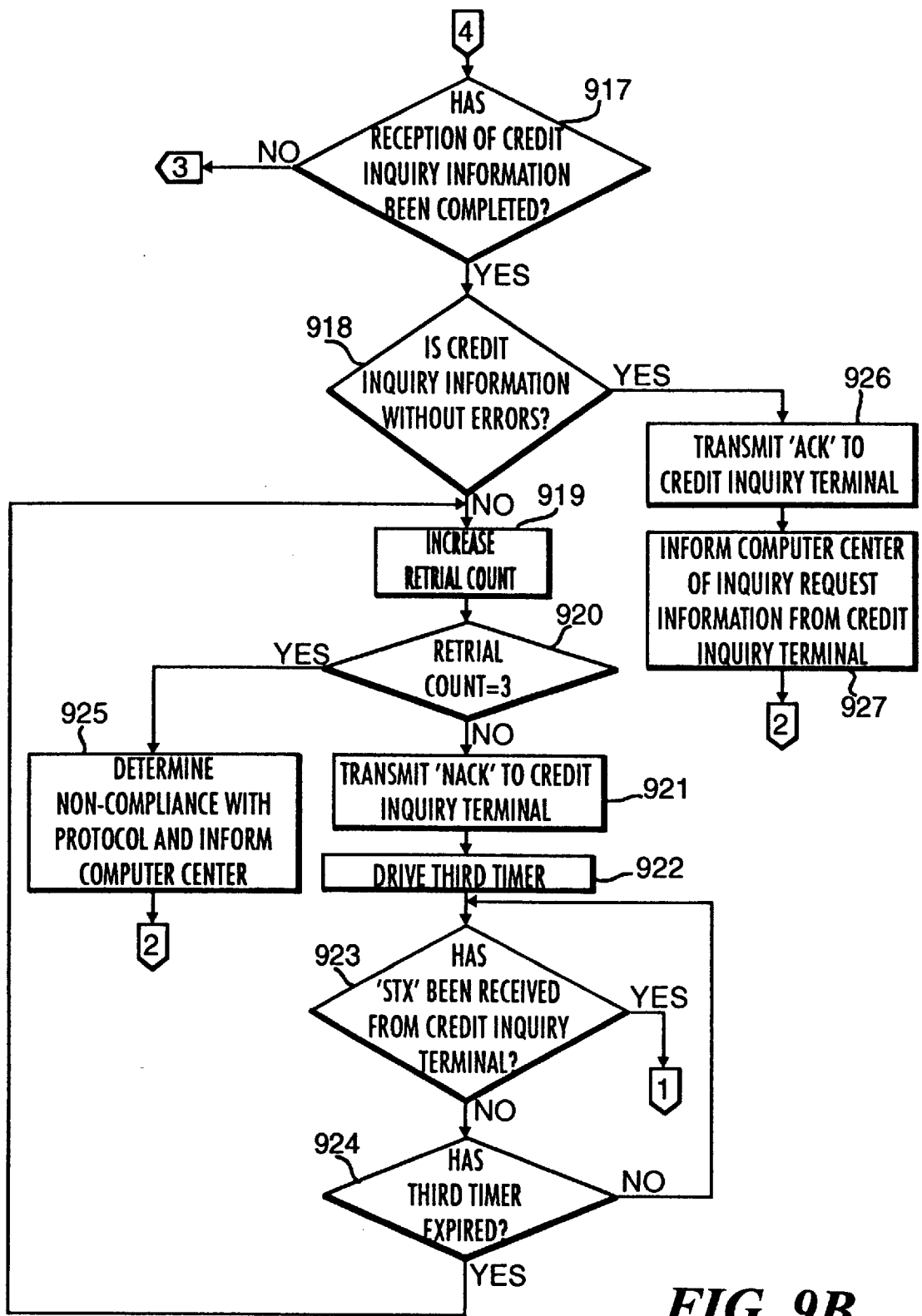
Figure 9C:
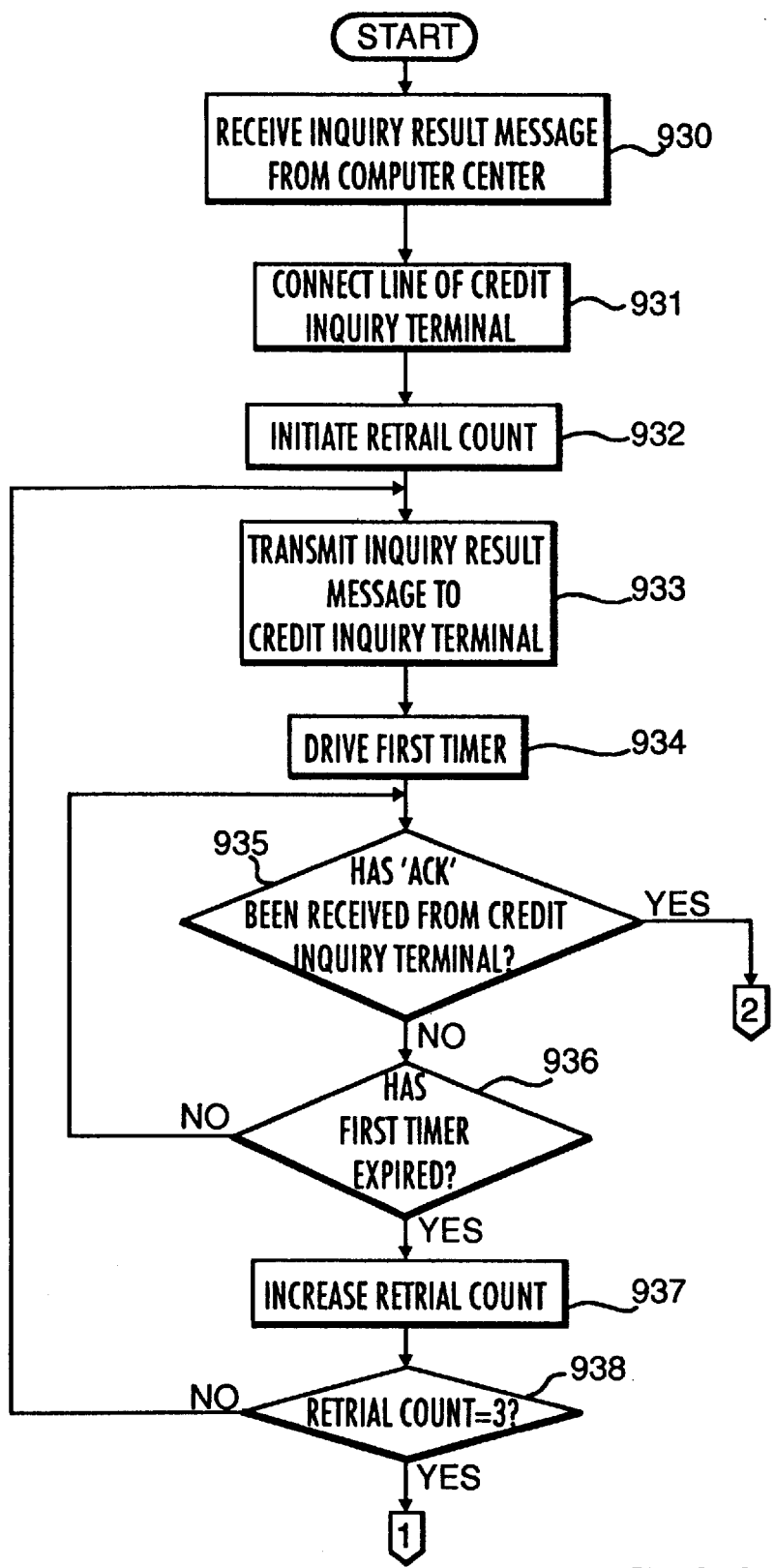
Figure 9D:
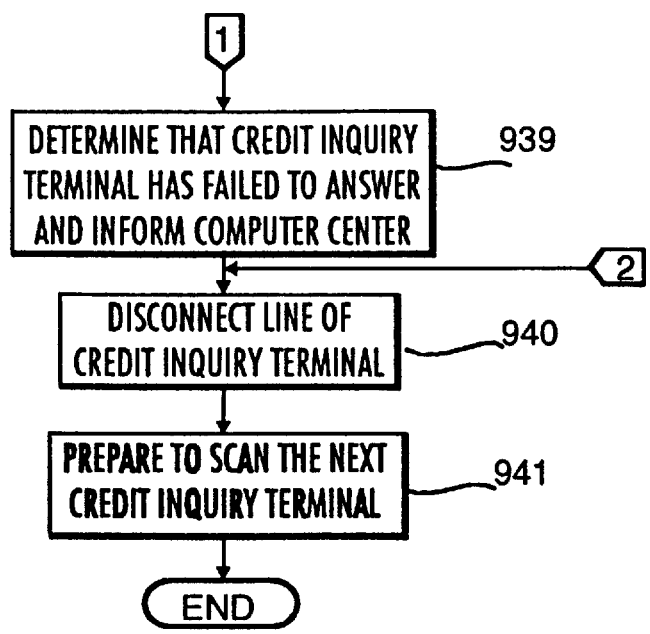

Referring to FIG. 9B, a flow chart illustrating how line multiplex device 500 processes the credit inquiry result of financial agency/card company's computer 505 in response to the credit inquiry request from credit inquiry terminal 501 is shown. That is, FIG. 9B specifically shows how line multiplex device 500 receives the inquiry result message from financial agency/card company's computer 505 via computer center 503, and then transmits the inquiry result message to the corresponding credit inquiry terminal 501. First, in step 930, line multiplex device 500 receives the inquiry result message from financial agency/card company's computer 505 via computer center 503. Next, in step 931, line multiplex device 500 controls multiplexer 508 to connect subscriber line 507 of the corresponding credit inquiry terminal 501 in order transmit the inquiry result message. Then, in step 932, line multiplex device 500 initiates the retrial count value to count the number of retrials, thereby ensuring compliance with the established protocols of credit inquiry terminal 501. Line multiplex device 500 then proceeds to step 933.

In step 933, the line multiplex device 500 transmits the inquiry result message to credit inquiry terminal 501 and then proceeds to step 934. In step 934, line multiplex device 500 drives the first timer to monitor the amount of time until acknowledge code ACK is received from credit inquiry terminal 501. In step 935, line multiplex device 500 determines whether acknowledge code ACK has been received from credit inquiry terminal 501. If acknowledge code ACK has not been received, line multiplex device 500 proceeds to step 936. In step 936, line multiplex device 500 determines whether the first timer has expired. If the first timer has expired, line multiplex device 500 proceeds to step 937. In step 937, line multiplex device 500 increases the retrial count by one and then proceeds to step 938. In step 938, line multiplex device 500 determines whether the retrial count value equals three. If the retrial count value does not equal three, line multiplex device 500 proceeds to step 933. In step 933, line multiplex device 500 re-transmits the inquiry result message to credit inquiry terminal 501. In step 936, however, if first timer has not expired, line multiplex device 500 repeatedly performs step 935.

In step 939, line multiplex device 500 determines that credit inquiry terminal 501 has failed to answer and then proceeds to step 940 after informing computer center 503 of this information. In step 940, line multiplex device 500 disconnects subscriber line 507 of the presently connected credit inquiry terminal 501 and then proceeds to step 941. In step 941, line multiplex device 500 prepares to scan the next credit inquiry terminal 501, thereby ending the operation.

Alternatively, if acknowledge code ACK is received from credit inquiry terminal 501 in step 935, after performing protocol with credit inquiry terminal 501, line multiplex device 500 disconnects the presently connected subscriber line 507 in step 940, and then proceeds to step 941. In step 941, line multiplex device 500 prepares to scan the next credit inquiry terminal 501, thereby ending the operation.

Figure 10A:
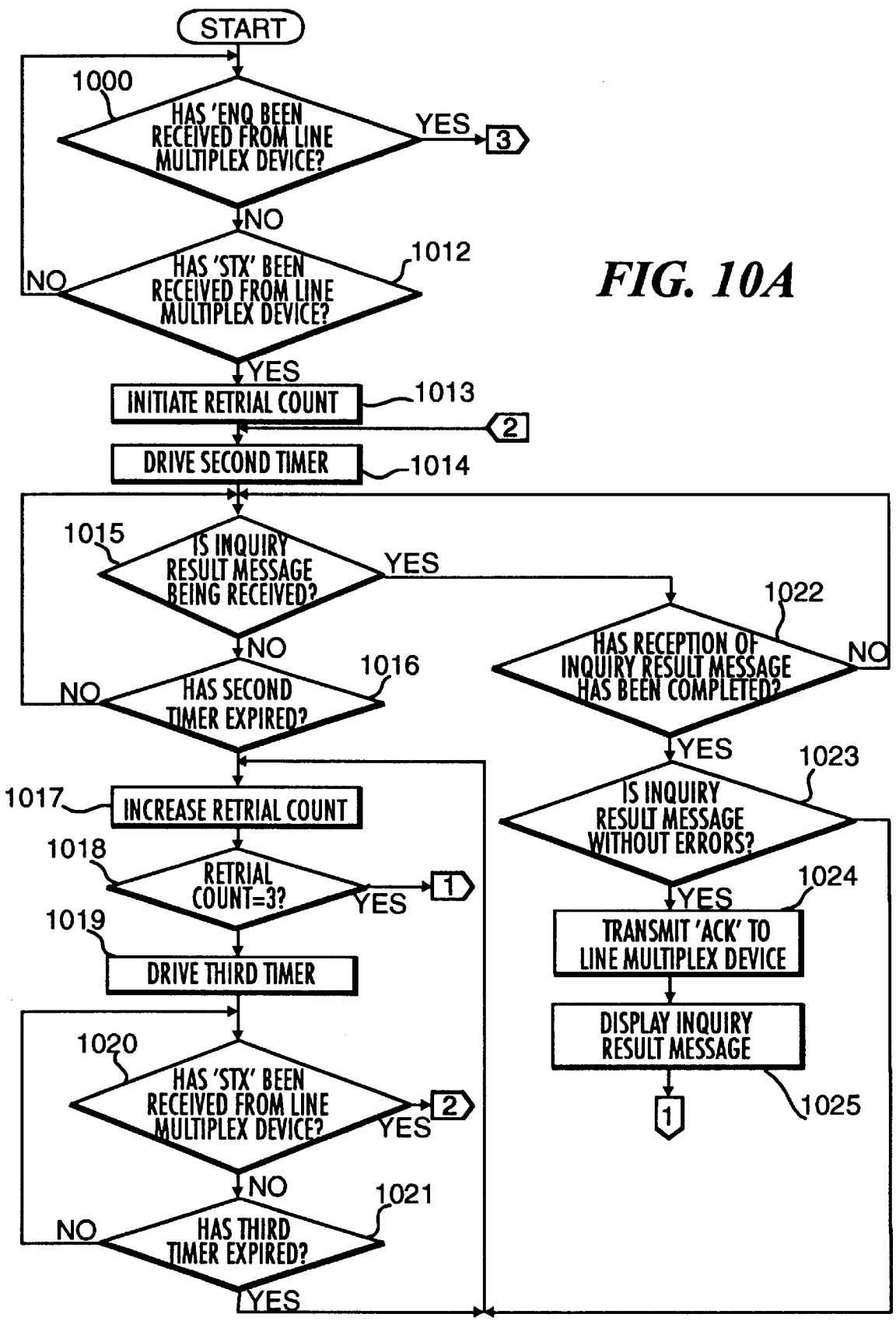
FIG. 10 is a flow chart showing the process of operation of the credit inquiry terminal in accordance with the principles of the present invention.
Figure 10:
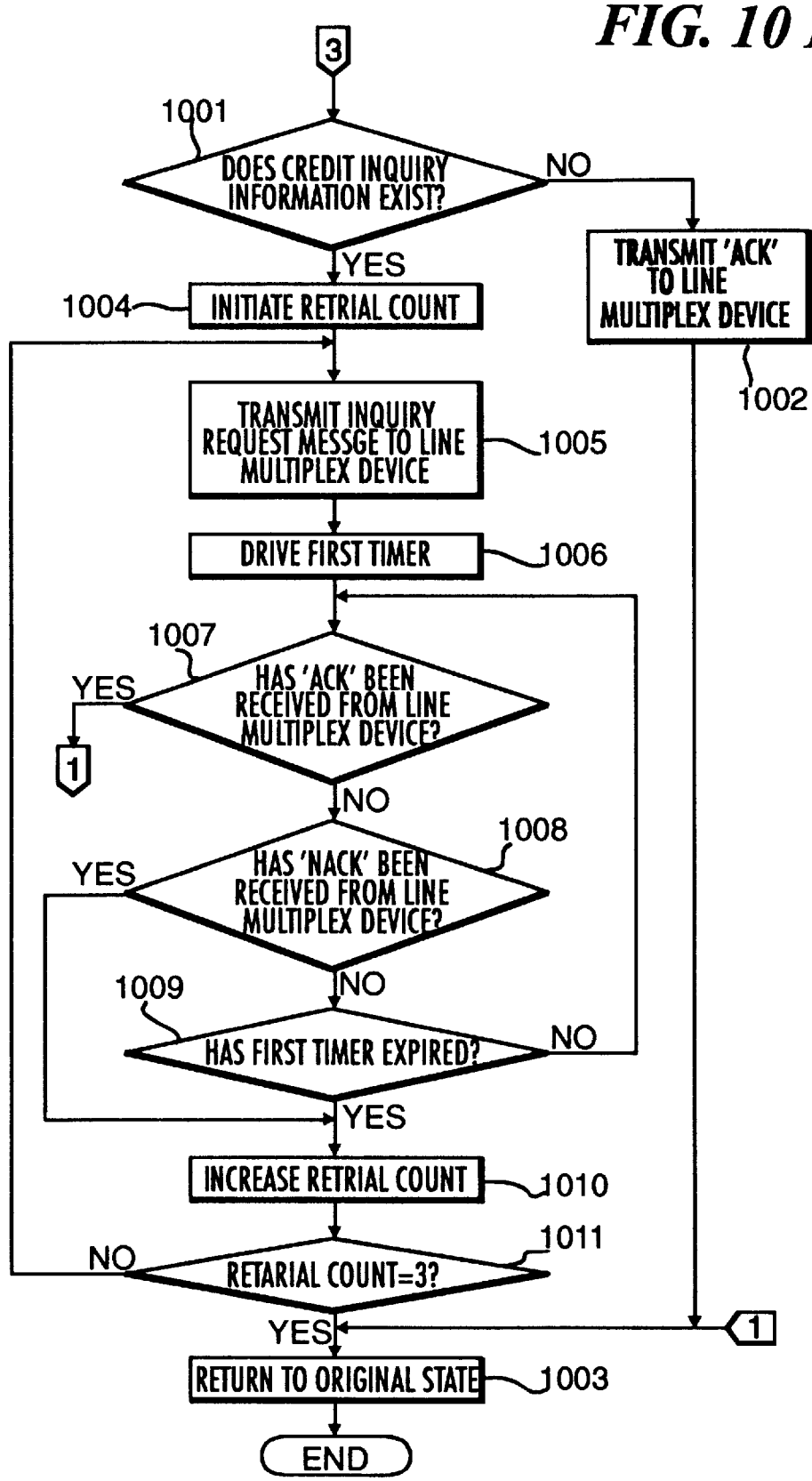

FIG. 10 is a flow chart illustrating operations of credit inquiry terminal 501 according to the present invention. In step 1000, credit inquiry terminal 501 determines whether inquiry code ENQ has been received from line multiplex device 500, and if received proceeds to step 1001. In step 1001, credit inquiry terminal 501 confirms whether credit inquiry information to be transmitted to line multiplex device 500 regarding inquiries about the credit standing of a check or credit card exists or not. If the information does not exist, credit inquiry terminal 501 proceeds to step 1002. In step 1002, credit inquiry terminal 501 transmits acknowledge code ACK to line multiplex device 500 and then returns to its original state in step 1003. If, credit inquiry terminal 501 determines that credit inquiry information exists in step 1001, it proceeds to step 1004. In step 1004, credit inquiry terminal 501 initiates the retrial count value to count the number of retrials, thereby conforming with the protocol of line multiplex device 500.

In step 1005, credit inquiry terminal 501 transmits the inquiry request message for inquiring about the credit standing of a check or credit card to line multiplex device 500, and then proceeds to step 1006. In step 1006, in response to transmission of the inquiry request message, credit inquiry terminal 501 drives the first timer to monitor the amount of time before receiving acknowledge code ACK or non-acknowledge code NACK from line multiplex device 500. Thereafter, in step 1007, credit inquiry terminal 501 determines whether acknowledge code ACK has been received from line multiplex device 500. If received, credit inquiry terminal 501 determines that line multiplex device 500 has correctly received acknowledge code ACK, and then proceeds to step 1003 where credit inquiry terminal 501 returns to its original state. If, however, in step 1007, acknowledge code ACK is not determined to have been received, credit inquiry terminal 501 proceeds to step 1008. In step 1008, credit inquiry terminal 501 determines whether non-acknowledge code NACK from line multiplex device 500 has been received. If it has not been received, credit inquiry terminal 501 determines from line multiplex device 500 whether the first timer has expired. If the first timer has expired, credit inquiry terminal 501 proceeds to step 1010. In step 1010, credit inquiry terminal 501 increases the retrial count value by one. Then, in step 1011, credit inquiry terminal 501 determines whether the retrial count value equals three. If the retrial count value is not equal to three, credit inquiry terminal 501 repeatedly performs step 1005 by re-transmitting the inquiry request message to line multiplex device 500. In step 1009, if the first timer has not expired, credit inquiry terminal 501 repeatedly performs step 1007. In step 1008, if non-acknowledge code NACK has been received from line multiplex device 500, credit inquiry terminal 501 sequentially performs steps 1010 and 1011.

In step 1000, if inquiry code ENQ is not received from line multiplex device 500, credit inquiry terminal 501 proceeds to step 1012. In step 1012, credit inquiry terminal 501 determines whether text start code STX (i.e. the first data entry of the inquiry request message) has been received from line multiplex device 500. If it has not been received, credit inquiry terminal 501 again proceeds to step 1000. In step 1000, credit inquiry terminal 501 repeatedly performs the step of checking whether inquiry code ENQ has been received from line multiplex device 500. In step 1012, if text start code STX has been received, credit inquiry terminal 501 proceeds to step 1013 where it initiates the retrial count value. Then, in step 1014, credit inquiry terminal 501 drives the second timer to monitor the amount of time before receiving the inquiry result message from line multiplex device 500, and then proceeds to step 1015. In step 1015, credit inquiry terminal 501 checks whether the inquiry result message from line multiplex device 500 has been received. If it has not been received, credit inquiry terminal 501 proceeds to step 1016 where it determines whether the second timer has expired. If the second timer has expired, credit inquiry terminal 501 proceeds to step 1017 where it increases the retrial count value by one and then proceeds to step 1018. In step 1018, credit inquiry terminal 501 determines whether the retrial count value equals three. If the retrial count value does not equal three, credit inquiry terminal 501 drives the third timer to monitor the amount of time before text start code STX (i.e. the first data input of the inquiry result message) is received from line multiplex device 500. Thereafter, in step 1020, credit inquiry terminal 501 determines whether text start code STX has been received from line multiplex device 500. If it has not been received, credit inquiry terminal 501 proceeds to step 1021 where it determines whether the third timer has expired. If the third timer has expired, credit inquiry terminal 501 proceeds again to step 1017 where it increases the retrial count value by one. If the third timer has not expired, credit inquiry terminal 501 repeatedly performs step 1020.

If the inquiry result message is being received in step 1015 above, credit inquiry terminal 501 receives the message from line multiplex device 500 and then determines in step 1022 whether reception of the inquiry result message has been completed. If reception has not been completed, credit inquiry terminal 501 repeatedly performs step 1015. If in step 1022 above, reception of the inquiry result message has been completed, credit inquiry terminal 501 proceeds to step 1023 where it checks the BCC value of the received information and determines whether the inquiry result message contains errors by performing backward error correction. If step 1023 indicates that errors exist, credit inquiry terminal 501 proceeds back to step 1017 where it increases the retrial count value by one. Then, in step 1018, credit inquiry terminal 501 determines whether the retrial count value equals three. If, however, step 1023 indicates that no errors exist in the inquiry result message, credit inquiry terminal 501 proceeds to step 1024 where it transmits acknowledge code ACK to line multiplex device 500 to indicate that the inquiry result message has been correctly received. Next, in step 1025, credit inquiry terminal 501 analyzes the inquiry result message and then displays the inquiry result message on liquid crystal display 709. Credit inquiry terminal 501 then proceeds to step 1003 to return to its original state.

Figure 11A:
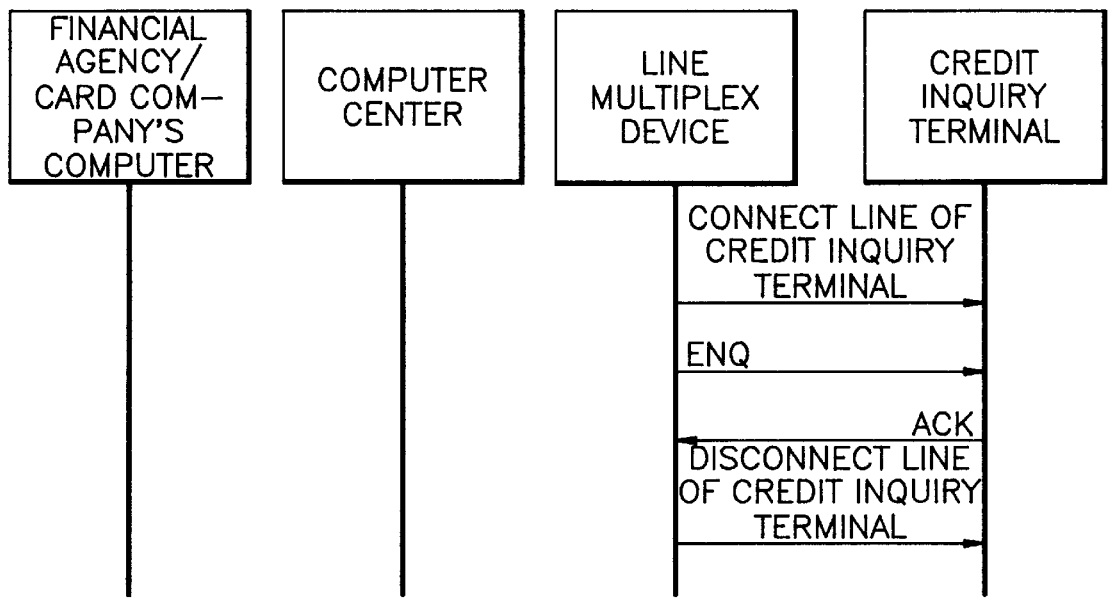
FIGS. 11A to 11C are flow charts showing operation of the credit inquiry service according to the principles of the present invention.
Figure 11B:
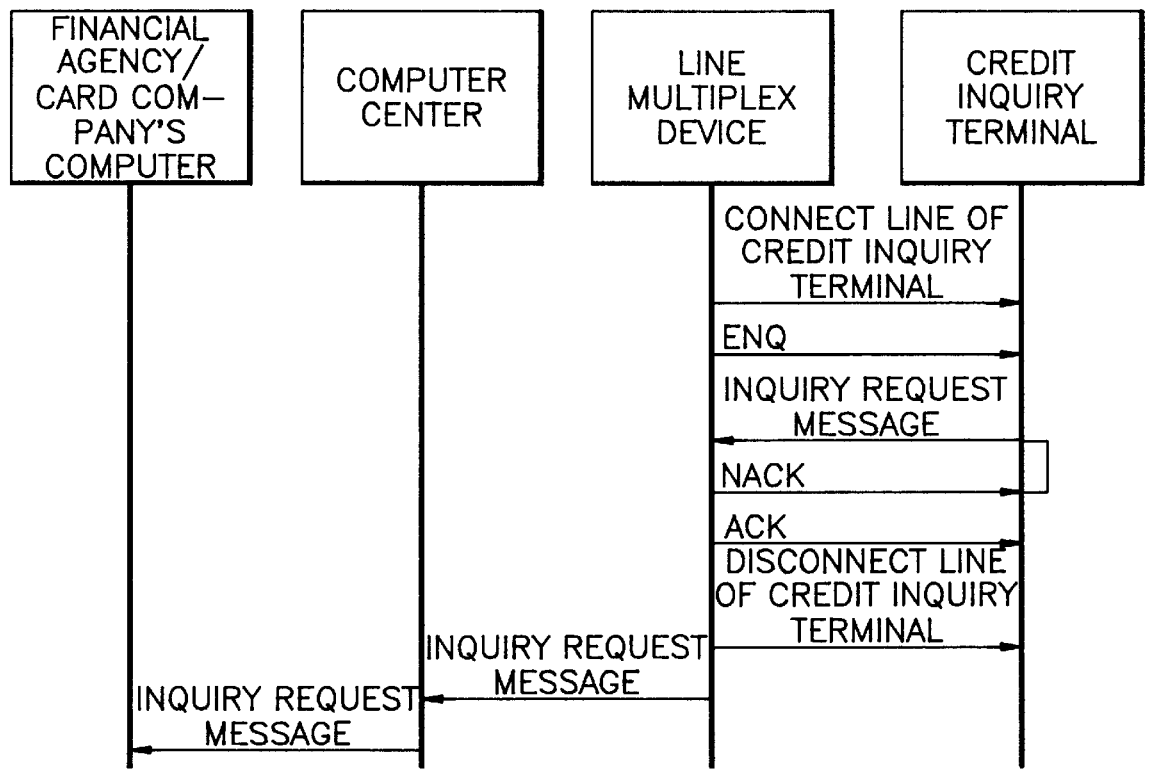
Figure 11C:
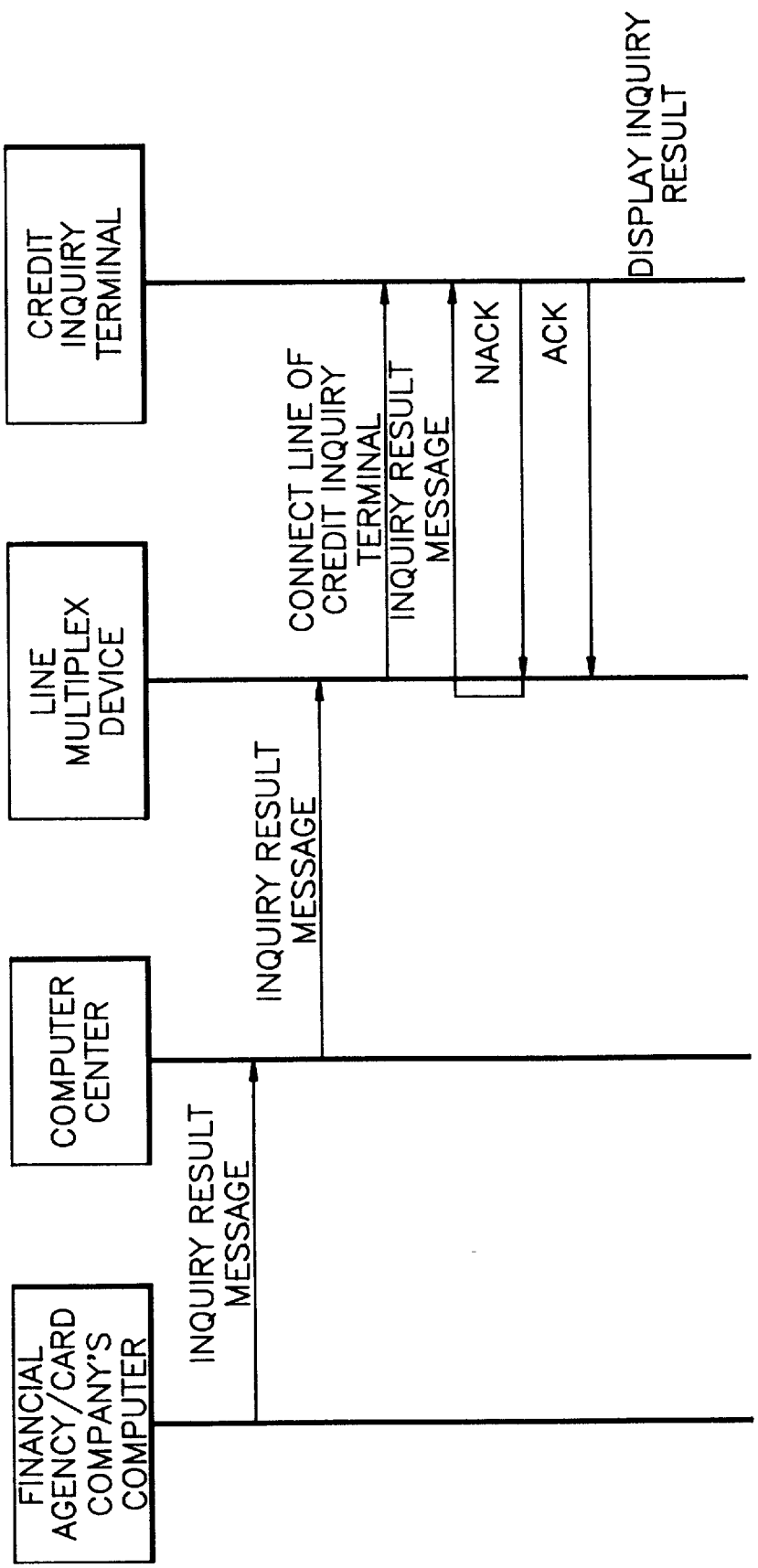

Referring now to FIGS. 11A to 11C, the process of performing the credit inquiry service according to the principles of the present invention is shown.

FIG. 11A shows operations performed between credit inquiry terminal 501 and line multiplex device 500, between line multiplex device 500 and computer center 503, and between computer center 503 and financial agency/card company's computer 505 in the stand-by state when credit inquiry terminal 501 is not inquiring about the credit standing of a check or credit card.

FIG. 11B shows the process of transmitting the inquiry result message regarding a check or credit card between credit inquiry terminal 501 and line multiplex device 500, between line multiplex device 500 and computer center 503, and between computer center 503 and financial agency/card company's computer 505 when credit inquiry terminal 501 has inquired about the credit standing of a check or credit card.

FIG. 11C shows the process of transmitting the inquiry result message between financial agency/card company's computer 505 and computer center 505, between computer center 503 and line multiplex device 500, and between line multiplex device 500 and credit inquiry terminal 501 when financial agency/card company's computer 505 responds to credit inquiry terminal's 501 inquiry about the credit standing of a check or credit card.

As described in the foregoing paragraphs of this detailed description, the credit standing of a check or credit card can be inquired about without influence on subscriber line 507, irrespective of subscriber line 507 use. Furthermore, it is possible to reduce the amount of time required in inquiring about the credit standing of a check or credit card by using direct communication between line multiplex device 500 and credit inquiry terminal 501 (i.e. without using the couplers discussed in the prior art). Moreover, the credit inquiry can be confirmed regardless of the kind or content of credit inquiry terminal 501, and regardless of the use of subscriber line 507 which connects to a public communication network. Computer center 503 can confirm the state of credit inquiry terminal 501 or can download information necessary to inquire about the credit standing to credit inquiry terminal 501 by connecting computer center 503 to credit inquiry terminal 501 using bi-directional communication therebetween.

While there is shown and described the preferred embodiment of the present invention, it will be understood by those skilled in the art from the foregoing that changes in form and details may be made without departing from the central spirit and scope of the present invention. Specifically, confirmation of the state of credit inquiry terminal 501 and performance of the credit inquiry are all illustrated in the preferred embodiment. If necessary, however, only one of the above two functions may be performed. Accordingly, the scope of the present invention is not defined by the described embodiment, but by the appending claims.

What is claimed is:

1. A credit inquiry service system for inquiring about the credit standing of a check or credit card using subscriber lines of a public communication network, said system comprising:

credit inquiry terminals each directly connected to a respective one of said subscriber lines, each one of said credit inquiry terminals generating and transmitting an inquiry request message requesting information regarding the credit standing of the check or credit card and receiving an inquiry result message corresponding to said inquiry request message via said respective one of said subscriber lines, said inquiry result message informing a user of the credit standing;

a line multiplex device for one by one serially selecting said subscriber lines directly connected to said credit inquiry terminals, receiving said inquiry request message from one of said credit inquiry terminals directly connected to a selected one of said subscriber lines, and transmitting said inquiry result message corresponding to said inquiry request message to said one of said credit inquiry terminals directly connected to said selected one of said subscriber lines;

a multiplexer connected to a distributor of said public communication network for accessing said subscriber lines and connecting said selected one of said subscriber lines to said line multiplex device; and a computer center for receiving said inquiry request message from said line multiplex device and transmitting said inquiry request information to a card company's computer, and then receiving said inquiry result message from said card company's computer and transmitting said inquiry result message to said line multiplex device.

2. The credit inquiry service system as claimed in claim 1, further comprised of each one of said credit inquiry terminals comprising:

a line communication circuit for performing a band spread spectrum operation on a first digital signal representative of said inquiry request message, converting said first digital signal into a first analog signal representative of said inquiry request message, transmitting said first analog signal to said line multiplex device via said selected one of said subscriber lines, receiving a second analog signal representative of said inquiry result message from said line multiplex device via said selected one of said subscriber lines, converting said second analog signal into a second digital signal representative of said inquiry result message and performing a reverse band spread spectrum operation upon said second digital signal;

an interface connected between said line communication circuit and said selected one of said subscriber lines for interfacing data received from and transmitted to said line multiplex device;

a card reader for reading magnetic data recorded on the credit card;

a keyboard for inputting inquiry information regarding the credit standing of the check or credit card;

a microcontroller for generating said inquiry request message from one of said magnetic data read from the credit card and said inquiry information input from said keyboard, enabling transmission of said first analog signal representative of said inquiry request message to said line multiplex device via said line communication circuit, receiving said inquiry result message via said line communication circuit, and then informing the user of the credit standing of the check or credit card in dependence upon said inquiry result message;

a variable visual display for displaying a processing state of said system and said inquiry result message pursuant to control of said microcontroller; and memory means for storing a program enabling said microcontroller to perform a credit inquiry process and for temporarily storing information generated during the credit inquiry process.

3. The credit inquiry service system as claimed in claim 1, wherein said multiplexer comprises:

a plurality of relays each connected to said respective one of said subscriber lines, said plurality of relays selectively connecting said subscriber lines to said line multiplex device in dependence upon a first control signal; and a multiplexer controller for generating said first control signal to control switching operations of said relays, said first control signal being generated in dependence upon a second control signal from said line multiplex device.

4. The credit inquiry service system as claimed in claim 2, wherein said multiplexer comprises:

a plurality of relays each connected to said respective one of said subscriber lines, said plurality of relays selectively connecting said subscriber lines to said line multiplex device in dependence upon a first control signal; and a multiplexer controller for generating said first control signal to control switching operations of said relays, said first control signal being generated in dependence upon a second control signal from said line multiplex device.

5. The credit inquiry service system as claimed in claim 1, wherein said line multiplex device comprises:

a multiplexer driver for generating a multiplexer control signal and transmitting said multiplexer control signal to said multiplexer to enable said one by one serial selection of said subscriber lines;

a terminal communication circuit for receiving a first analog signal representative of said inquiry request message from said one of said credit inquiry terminals via said selected one of said subscriber lines, converting said first analog signal into a first digital signal representative of said inquiry request message, performing a reverse band spread spectrum operation on said first digital signal to generate said inquiry request message, receiving a second digital signal representative of said inquiry result message, performing a band spread spectrum operation on said second digital signal, converting said second digital signal into a second analog signal representative of said inquiry result message, and transmitting said second analog signal to said one of said credit inquiry terminals via said selected one of said subscriber lines;

a computer center communication circuit for transmitting and receiving data exchanged between said terminal communication circuit and said computer center; and a microcontroller for making said one by one serial selection of said subscriber lines by controlling said multiplexer driver, transmitting said inquiry request message from said terminal communication circuit to said computer center via said computer center communication circuit, receiving said second digital signal representative of said inquiry result message from said computer center via said computer center communication circuit, controlling said multiplexer driver to enable selection of said selected one of said subscriber lines, and enabling transmission of said second analog signal representative of said inquiry result message to said one of said credit inquiry terminals directly connected to said selected one of said subscriber lines via said terminal communication circuit.

6. The credit inquiry service system as claimed in claim 2, wherein said line multiplex device comprises:

a multiplexer driver for generating a multiplexer control signal and transmitting said multiplexer control signal to said multiplexer to enable said one by one serial selection of said subscriber lines;

a terminal communication circuit for receiving said first analog signal representative of said inquiry request message from said one of said credit inquiry terminals via said selected one of said subscriber lines, converting said first analog signal into said first digital signal representative of said inquiry request signal, performing said reverse band spread spectrum operation on said first digital signal to generate said inquiry request message, receiving said second digital signal representative of said inquiry result message, performing said band spread spectrum operation on said second digital signal, converting said second digital signal into said second analog signal representative of said inquiry result message, and transmitting said second analog signal to said one of said credit inquiry terminals via said selected one of said subscriber lines;

a computer center communication circuit for transmitting and receiving data exchanged between said terminal communication circuit and said computer center; and a microcontroller for making said one by one serial selection of said subscriber lines by controlling said multiplexer driver, transmitting said inquiry request message from said terminal communication circuit to said computer center via said computer center communication circuit, receiving said second digital signal representative of said inquiry result message from said computer center via said computer center communication circuit, controlling said multiplexer driver to enable selection of said selected one of said subscriber lines, and enabling transmission of said second analog signal representative of said inquiry result message to said one of said credit inquiry terminals directly connected to said selected one of said subscriber lines via said terminal communication circuit.

7. A credit inquiry terminal of a credit inquiry service system for inquiring about the credit standing of a check or credit card from a computer center by using a selected subscriber line of a public communication network, said terminal comprising:

a line communication circuit for performing a band spread spectrum operation on a first digital signal representative of an inquiry request message requesting a credit inquiry of the check or credit card, converting said first digital signal into a first analog signal representative of said inquiry request message, transmitting said first analog signal to a line multiplex device via said selected subscriber line, receiving a second analog signal representative of an inquiry result message providing results of the credit inquiry from said line multiplex device via said selected subscriber line, converting said second analog signal into a second digital signal representative of said inquiry result message and performing a reverse band spread spectrum operation upon said second digital signal;

an interface connected between said line communication circuit and said selected subscriber line for interfacing data received from and transmitted to said line multiplex device;

a card reader for reading magnetic data recorded on the credit card;

a keyboard for inputting inquiry information regarding the credit standing of the check or credit card;

a microcontroller for generating said inquiry request message from one of said magnetic data read from the credit card and said information input from said keyboard, enabling transmission of said first analog signal representative of said inquiry request message to said line multiplex device via said line communication circuit, receiving said inquiry result message via said line communication circuit, and then informing a user of the credit standing of the check or credit card in dependence upon said inquiry result message;

a variable visual display for displaying a processing state of said system and said inquiry result message pursuant to control of said microcontroller; and memory means for storing a program enabling said microcontroller to perform a credit inquiry process and for temporarily storing information generated during the credit inquiry process.

8. A credit inquiry service method for inquiring about the credit standing of a check or credit card from a computer center by using credit inquiry terminals directly connected to respective subscriber lines of a public communication network equipped with a line multiplex device using a wired spread spectrum modem for communication between the computer center and the credit inquiry terminals, said method comprising the steps of:

scanning, at said line multiplex device, a first credit inquiry terminal requesting the credit standing of the check or the credit card from the computer center after selecting a first subscriber line corresponding to said first credit inquiry terminal and connecting said first subscriber line to said first credit inquiry terminal;

determining whether inquiry request information for inquiring about the credit standing of the check or credit card from said first credit inquiry terminal exists;

disconnecting said first subscriber line when said inquiry request information is determined not to exist;

transmitting said inquiry request information to said computer center when said inquiry request information from said first credit inquiry terminal exists; and transmitting inquiry result information corresponding to said inquiry request information to said first credit inquiry terminal via said first subscriber line after receiving said inquiry result information from said computer center, said inquiry result information representative of the credit standing of the check or credit card.

9. The credit inquiry service method as claimed in claim 8, said method further comprising the step of preparing to scan a second credit inquiry terminal after disconnecting said first subscriber line when said inquiry request information is determined not to exist.

10. The credit inquiry service method as claimed in claim 9, said method further comprising the step of determining whether said inquiry request information contains errors after determining that said inquiry request information exists.

11. A credit inquiry service method for inquiring about the credit standing of a check or credit card from a computer center by using credit inquiry terminals directly connected to respective subscriber lines of a spread spectrum communication network equipped with a line multiplex device using a wired spread spectrum modem for communication between the computer center and the credit inquiry terminals, said method comprising the steps of:

determining whether credit inquiry information regarding the credit standing of the check or credit card exists via said spread spectrum communication network equipped with said line multiplex device in response to receipt of an inquiry code from a first credit inquire terminal via a first subscriber line;

generating inquiry request information requesting the credit standing of the check or credit card and transmitting said inquiry request information over said first subscriber line when said credit inquiry information exists;

transmitting data indicating a nonexistence of said inquiry request information over said first subscriber line and then returning to an original state when said credit inquiry information does not exist;

receiving inquiry result information representing the credit status of the check or credit card for said first subscriber line in response to said transmission of said inquiry request information over said first subscriber line; and providing a variable visual display of said inquiry result information after said inquiry result information is received from said first subscriber line.

12. A credit inquiry service method for inquiring about the credit standing of a check or credit card through a computer center by one by one serially selecting subscriber lines of a public communication network directly connected to respective credit inquiry terminals and by having a line multiplex device for providing communication between said credit inquiry terminals and a computer center, said method comprising the steps of:

selecting a first subscriber line directly connected to a first credit inquiry terminal using said line multiplex device;

connecting said first subscriber line to said line multiplex device to enable said line multiplex device to scan said first credit inquiry terminal;

determining whether a first code has been transmitted from said first credit inquiry terminal to said line multiplex device;

determining whether inquiry request information for inquiring about the credit standing of the check or credit card has been transmitted from said first credit inquiry terminal to said line multiplex device after said line multiplex device receives said first code from said first credit inquiry terminal;

returning said first credit inquiry terminal to an original state after transmission of said inquiry request information to said line multiplex device;

disconnecting said first subscriber line from said line multiplex device when said line multiplex device determines that said inquiry request information has not been transmitted from said first credit inquiry terminal to said line multiplex device;

transmitting said inquiry request information from said line multiplex device to said computer center after said line multiplex device receives said inquiry request information from said first credit inquiry terminal;

transmitting said inquiry request information from said computer center to a financial company's computer after said computer center receives said inquiry request information from said line multiplex device, and then transmitting inquiry result information responding to said inquiry request information to said line multiplex device after said computer center receives said inquiry result information from said financial company's computer;

transmitting said inquiry result information to said first credit inquiry terminal after said line multiplex device receives said inquiry result information from said computer center; and providing a variable visual display of said inquiry result information for a user after said first credit inquiry terminal receives said inquiry result information.

13. The credit inquiry service method as claimed in claim 12, said method further comprising the step of disconnecting said first credit inquiry terminal from said line multiplex device when said first code is not received from said first credit inquiry terminal.

14. The credit inquiry service method as claimed in claim 13, said method further comprising the step of preparing to scan a second credit inquiry terminal after said first credit inquiry terminal is disconnected from said line multiplex device.

15. A credit inquiry service system for inquiring about the credit standing of a check or credit card from a computer center by using subscriber lines of a public communication network, said system comprising:

credit inquiry terminals each directly connected to a respective one of said subscriber lines, each one of said credit inquiry terminals generating and transmitting an inquiry request message requesting information regarding the credit standing of the check or credit card and receiving an inquiry result message corresponding to said inquiry request message via said respective one of said subscriber lines, said inquiry result message informing a user of the credit standing, each one of said credit inquiry terminals comprising:

a line communication circuit for band spreading a first digital signal representative of said inquiry request message, converting said first digital signal into a first analog signal representative of said inquiry request message, transmitting said first analog signal via a selected one of said subscriber lines, receiving a second analog signal representative of said inquiry result message via said selected one of said subscriber lines, converting said second analog signal into a second digital signal representative of said inquiry result message, band de-spreading said second digital signal to generate said inquiry result message and displaying said inquiry result message to the user; and a line multiplex device for one by one serially selecting said subscriber lines, said line multiplex device comprising:

a multiplexer driver for generating a multiplexer control signal to enable said one by one serial selection of said subscriber lines;

a terminal communication circuit for receiving said first analog signal representative of said inquiry request message from said respective one of said credit inquiry terminals via said selected one of said subscriber lines, converting said first analog signal into said first digital signal representative of said inquiry request message, band de-spreading said first digital signal to generate said inquiry request message, receiving said second digital signal representative of said inquiry result message, band spreading said second digital signal, converting said second digital signal into said second analog signal representative of said inquiry result message, and transmitting said second analog signal to said respective one of said credit inquiry terminals via said selected one of said subscriber lines;

a computer center communication circuit for transmitting and receiving data exchanged between said terminal communication circuit and a computer center; and a microcontroller for making said one by one serial selection of said subscriber lines by controlling said multiplexer driver, transmitting said inquiry request message from said terminal communication circuit to said computer center via said computer center communication circuit, receiving said second digital signal representative of said inquiry result message from said computer center via said computer center communication circuit, controlling said multiplexer driver to enable selection of said selected one of said subscriber lines, and enabling transmission of said second analog signal representative of said inquiry result message to said respective one of said credit inquiry terminals directly connected to said selected one of said subscriber lines via said terminal communication circuit.

16. The credit inquiry service system as claimed in claim 15, further comprised of said line communication circuit comprising:

transmission/reception control means for generating control signals for controlling modulation and de-modulation of said first digital signal representative of said inquiry request message and said second digital signal representative of said inquiry result message, respectively;

pseudo noise code generation means for generating a pseudo noise code enabling band spreading of said first digital signal and band de-spreading of said second digital signal;

modulation means for serially converting said first digital signal, adding a parity bit to said first digital signal, band spreading said first digital signal in dependence upon said pseudo noise code, adding header and synchronization data to said first digital signal in dependence upon a first of said control signals;

transmission conversion means for receiving said first digital signal from said modulation means, converting said first digital signal into said first analog signal and transmitting said first analog signal via said selected one of said subscriber lines;

reception conversion means for receiving said second analog signal representative of said inquiry result message via said selected one of said subscriber lines and converting said second analog signal into said second digital signal; and demodulation means for receiving said second digital signal from said reception conversion means, band de-spreading said second digital signal in dependence upon said pseudo noise code, converting said second digital signal to parallel to generate said inquiry result message and transmitting said inquiry result message to variable visual display means for display.

17. The credit inquiry service system as claimed in claim 15, further comprised of said terminal communication circuit comprising:

transmission/reception control means for generating control signals for controlling modulation and de-modulation of said second digital signal representative of said inquiry result message and said first digital signal representative of said inquiry request message, respectively;

pseudo noise code generation means for generating a pseudo noise code enabling band spreading of said second digital signal and band de-spreading of said first digital signal;

modulation means for serially converting said second digital signal, adding a parity bit to said second digital signal, band spreading said second digital signal in dependence upon said pseudo noise code, adding header and synchronization data to said second digital signal in dependence upon a first of said control signals;

transmission conversion means for receiving said second digital signal from said modulation means, converting said second digital signal into said second analog signal and transmitting said second analog signal via said selected one of said subscriber lines;

reception conversion means for receiving said first analog signal representative of said inquiry request message via said selected one of said subscriber lines and converting said first analog signal into said first digital signal; and demodulation means for receiving said first digital signal from said reception conversion means, band de-spreading said first digital signal in dependence upon said pseudo noise code, converting said first digital signal to parallel to generate said inquiry request message and transmitting said inquiry request message to said computer center.

18. A credit inquiry service method for inquiring about the credit standing of a check or credit card using a credit inquiry terminal coupled through a respective subscriber line to a line multiplex device for providing communication between said credit inquiry terminal and a computer center, said method comprising the steps of:

determining whether said credit inquiry terminal has received a first code from said line multiplex device, said first code requesting a response from said credit inquiry terminal;

determining whether credit inquiry information exists if said credit inquiry terminal has received said first code from said line multiplex device;

initiating a count value if said credit inquiry information exists;

transmitting an inquiry request message requesting information regarding the credit standing of the check or credit card from said credit inquiry terminal to said line multiplex device and driving a first timer;

determining whether said credit inquiry terminal has received a second code from said line multiplex device and returning said credit inquiry terminal to an original state if said second code is received, said second code indicating that the response from said credit inquiry terminal needs to be provided;

determining whether said credit inquiry terminal has received a third code from said line multiplex device if said second code has not been received, said third code indicating that a negative response has been provided by said credit inquiry terminal;

determining whether said first timer has expired if said credit inquiry terminal has not received said third code from said line multiplex device;

increasing said count value if one of said credit inquiry terminal has received said third code from said line multiplex device and said first timer has expired;

determining whether said count value equals three, returning said credit inquiry terminal to said original state if said count value equals three and returning to said transmitting step if said count value does not equal three;

determining whether a fourth code indicating entry of a first character of text by said credit inquiry terminal has been received from said line multiplex device, if said credit inquiry terminal has not received said first code from said line multiplex device;

initiating said count value if said fourth code has been received from said line multiplex device;

driving a second timer;

determining whether an inquiry result message informing a user of the credit standing of the check or credit card is currently being received by said credit inquiry terminal;

determining whether said inquiry result message has been completely received by said credit inquiry terminal without errors;

displaying said inquiry result message to the user on a variable visual display if said inquiry result message has been completely received by said credit inquiry terminals without errors;

determining whether said second timer has expired if said inquiry result message is not currently being received by said credit inquiry terminals;

increasing said count value if said second timer has expired;

determining whether said count value equals three and returning said credit inquiry terminal to said original state if said count value equals three;

driving a third timer if said count value does not equal three;

making a second determination as to whether said credit inquiry terminal has received said first code from said line multiplex device;

determining whether said third timer has expired if said second determination indicates that said credit inquiry terminal has not received said first code from said line multiplex device and then increasing said count value if said third timer has expired; and returning to said step of driving said second timer if said second determination indicates that said credit inquiry terminal has received said first code from said line multiplex device.

19. A credit inquiry service system for inquiring about the credit standing of a check or credit card using subscriber lines of a spread spectrum communication network, said system comprising:

at least one credit inquiry terminal connected to a subscriber line of said spread spectrum communication network, for transmitting an inquiry request message to request information regarding the credit standing of the check or credit card and for receiving an inquiry result message to inform a user of the credit standing corresponding to said inquiry request message;

a line multiplex device for one by one serially selecting said subscriber line directly connected to said credit inquiry terminal, receiving said inquiry request message from one of said credit inquiry terminals directly connected to said subscriber line, and transmitting said inquiry result message corresponding to said inquiry request message to said credit inquiry terminal directly connected to said subscriber line; and a computer center for receiving said inquiry request message from said credit inquiry terminal via said line multiplex device, and transmitting said inquiry request information to a card company's computer, and then receiving said inquiry result message from said card company's computer and transmitting said inquiry result message to said credit inquiry terminal via said line multiplex device.

20. The credit inquiry service system as claimed in claim 19, further comprised of said credit inquiry terminal comprising:

a line communication circuit for performing a band spread spectrum operation on a first digital signal representative of said inquiry request message, converting said first digital signal into a first analog signal representative of said inquiry request message, transmitting said first analog signal to said line multiplex device via said subscriber line, receiving a second analog signal representative of said inquiry result message from said line multiplex device via said subscriber line, converting said second analog signal into a second digital signal representative of said inquiry result message and performing a reverse band spread spectrum operation upon said second digital signal;

an interface connected between said line communication circuit and said subscriber line for interfacing data received from and transmitted to said line multiplex device;

a card reader for reading magnetic data recorded on the credit card;

a keyboard for inputting inquiry information regarding the credit standing of the check or credit card;

a controller for generating said inquiry request message from one of said magnetic data read from the credit card and said inquiry information input from said keyboard, enabling transmission of said first analog signal representative of said inquiry request message to said line multiplex device via said line communication circuit, receiving said inquiry result message via said line communication circuit, and then informing the user of the credit standing of the check or credit card in dependence upon said inquiry result message;

a display unit for providing a variable visual display of a processing state of said system and said inquiry result message under control of said controller; and a memory for storing a program enabling said controller to perform a credit inquiry process and for temporarily storing information generated during the credit inquiry process.

21. The credit inquiry service system as claimed in claim 19, further comprising a multiplexer connected to said spread spectrum communication network for connecting said subscriber line to said line multiplex device, said multiplexer comprising:

at least a relay connected to said subscriber line, for selectively connecting said subscriber line to said line multiplex device in dependence upon a first control signal; and a controller for generating said first control signal to control switching operations of said relay, said first control signal being generated in dependence upon a second control signal from said line multiplex device.

22. The credit inquiry service system as claimed in claim 21, wherein said line multiplex device comprises:

a multiplexer driver for generating a multiplexer control signal and transmitting said multiplexer control signal to said multiplexer to enable said one by one serial selection of said subscriber line;

a terminal communication circuit for receiving a first analog signal representative of said inquiry request message from said credit inquiry terminal via said subscriber line, converting said first analog signal into a first digital signal representative of said inquiry request message, performing a reverse band spread spectrum operation on said first digital signal to generate said inquiry request message, receiving a second digital signal representative of said inquiry result message, performing a band spread spectrum operation on said second digital signal, converting said second digital signal into a second analog signal representative of said inquiry result message, and transmitting said second analog signal to said credit inquiry terminal via said subscriber line;

a computer center communication circuit for transmitting and receiving data exchanged between said terminal communication circuit and said computer center; and a controller for making said one by one serial selection of said subscriber line by controlling said multiplexer driver, transmitting said inquiry request message from said terminal communication circuit to said computer center via said computer center communication circuit, receiving said second digital signal representative of said inquiry result message from said computer center via said computer center communication circuit, controlling said multiplexer driver to enable selection of said subscriber line, and enabling transmission of said second analog signal representative of said inquiry result message to said one of said credit inquiry terminals directly connected to said subscriber line via said terminal communication circuit.

23. The credit inquiry service system as claimed in claim 20, further comprised of said line communication circuit comprising:

a transmission/reception controller for generating control signals for controlling modulation and de-modulation of said first digital signal representative of said inquiry request message and said second digital signal representative of said inquiry result message, respectively;

a pseudo noise code generator for generating a pseudo noise code enabling band spreading of said first digital signal and band de-spreading of said second digital signal;

a modulator for serially converting said first digital signal, adding a parity bit to said first digital signal, band spreading said first digital signal in dependence upon said pseudo noise code, adding header and synchronization data to said first digital signal in dependence upon a first of said control signals;

a transmission conversion unit for receiving said first digital signal from said modulator, converting said first digital signal into said first analog signal and transmitting said first analog signal via said subscriber line;

a reception conversion unit for receiving said second analog signal representative of said inquiry result message via said subscriber line and converting said second analog signal into said second digital signal; and a demodulator for receiving said second digital signal from said reception conversion unit, band de-spreading said second digital signal in dependence upon said pseudo noise code, converting said second digital signal to parallel to generate said inquiry result message and transmitting said inquiry result message to said display unit for said variable visual display.

24. The credit inquiry service system as claimed in claim 20, further comprised of said terminal communication circuit comprising:

a transmission/reception controller for generating control signals for controlling modulation and de-modulation of said second digital signal representative of said inquiry result message and said first digital signal representative of said inquiry request message, respectively;

a pseudo noise code generator for generating a pseudo noise code enabling band spreading of said second digital signal and band de-spreading of said first digital signal;

a modulator for serially converting said second digital signal, adding a parity bit to said second digital signal, band spreading said second digital signal in dependence upon said pseudo noise code, adding header and synchronization data to said second digital signal in dependence upon a first of said control signals;

a transmission conversion unit for receiving said second digital signal from said modulator, converting said second digital signal into said second analog signal and transmitting said second analog signal via said subscriber line;

a reception conversion unit for receiving said first analog signal representative of said inquiry request message via said subscriber line and converting said first analog signal into said first digital signal; and a demodulator for receiving said first digital signal from said reception conversion unit, band de-spreading said first digital signal in dependence upon said pseudo noise code, converting said first digital signal to parallel to generate said inquiry request message and transmitting said inquiry request message to said computer center.

* * * * *